(12) United States Patent
Yoshioka

(10) Patent No.: US 8,613,274 B2
(45) Date of Patent: Dec. 24, 2013

(54) SPARK IGNITION TYPE INTERNAL COMBUSTION ENGINE

(75) Inventor: Mamoru Yoshioka, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 195 days.

(21) Appl. No.: 13/148,134

(22) PCT Filed: Feb. 12, 2009

(86) PCT No.: PCT/JP2009/052826
§ 371 (c)(1),
(2), (4) Date: Aug. 5, 2011

(87) PCT Pub. No.: WO2010/092698
PCT Pub. Date: Aug. 19, 2010

(65) Prior Publication Data
US 2011/0290218 A1  Dec. 1, 2011

(51) Int. Cl.
*F02M 25/07* (2006.01)
*F02M 25/00* (2006.01)

(52) U.S. Cl.
USPC .................... 123/568.15; 701/108

(58) Field of Classification Search
USPC ............... 123/568.15, 568.21, 568.11, 90.15, 123/48 R, 48 C; 701/108, 105; 60/278
See application file for complete search history.

(56) References Cited

U.S. PATENT DOCUMENTS

| | | | |
|---|---|---|---|
| 5,203,311 | A | 4/1993 | Hitomi et al. |
| 2009/0187329 | A1 | 7/2009 | Akihisa et al. |
| 2010/0204907 | A1* | 8/2010 | Nakatani et al. ............. 701/108 |

FOREIGN PATENT DOCUMENTS

| | | |
|---|---|---|
| JP | A-4-175452 | 6/1992 |
| JP | A-6-185382 | 7/1994 |
| JP | A-2002-47951 | 2/2002 |
| JP | A-2004-245046 | 9/2004 |
| JP | A-2007-71046 | 3/2007 |
| JP | A-2007-71075 | 3/2007 |
| JP | A-2007-247612 | 9/2007 |
| JP | A-2007-303364 | 11/2007 |
| JP | A-2007-303423 | 11/2007 |
| JP | A-2007-332877 | 12/2007 |
| JP | A-2008-267308 | 11/2008 |

OTHER PUBLICATIONS

Jun. 22, 2011 International Preliminary Report on Patentability issued in International Patent Application No. PCT/JP2009/052826.
International Search Report issued in International Application No. PCT/JP2009/052826 on May 26, 2009 (with translation).

* cited by examiner

*Primary Examiner* — Mahmoud Gimie
(74) *Attorney, Agent, or Firm* — Oliff & Berridge, PLC

(57) ABSTRACT

A spark ignition type internal combustion engine of the present invention comprises a variable closing timing mechanism able to change a closing timing of an intake valve after intake bottom dead center and an EGR mechanism making a part of the exhaust gas flow again into a combustion chamber as EGR gas. The EGR mechanism is controlled so that the amount of EGR gas is reduced when the closing timing of the intake valve is at a retarded side, compared with when it is at an advanced side. Due to this, occurrence of variation among cylinders in the air-fuel ratio and intake resistance along with blowback of intake gas can be suppressed.

17 Claims, 21 Drawing Sheets

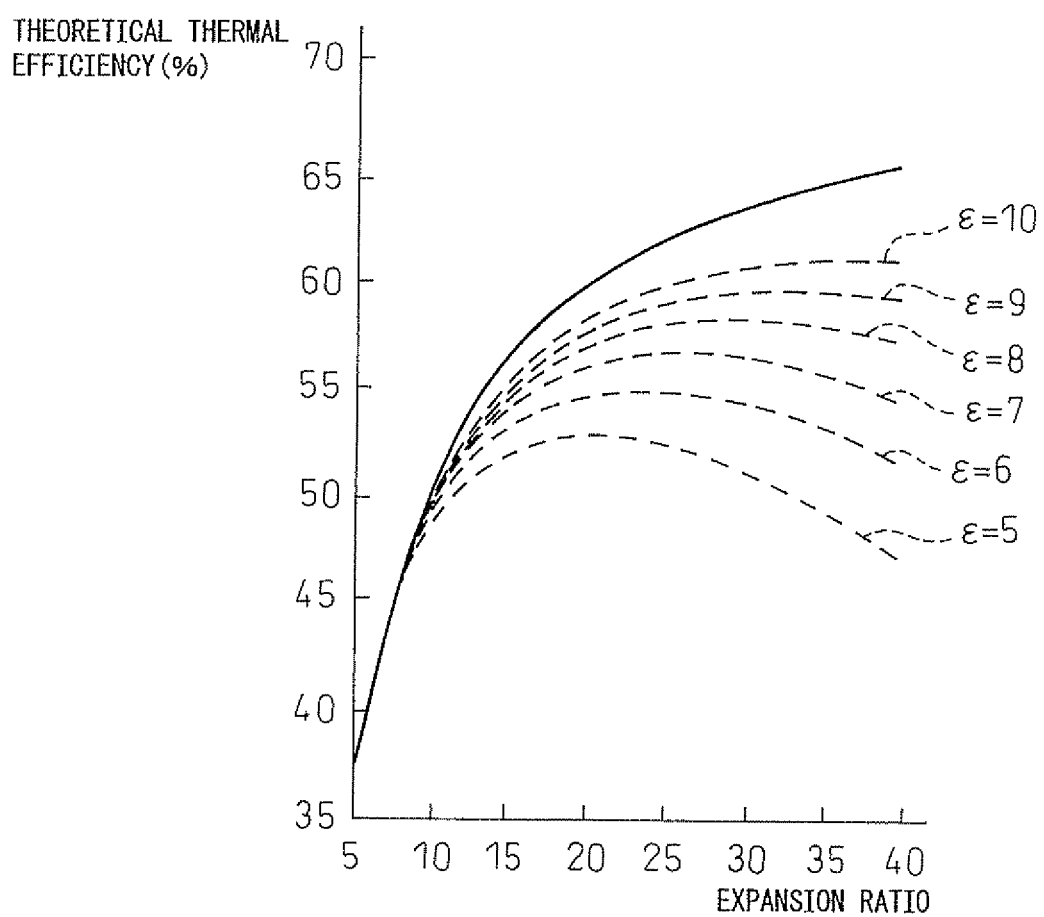

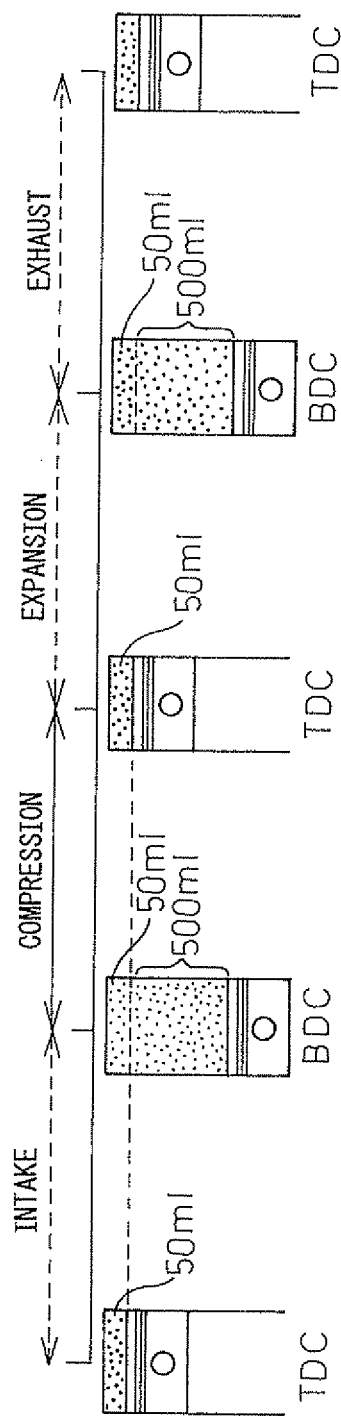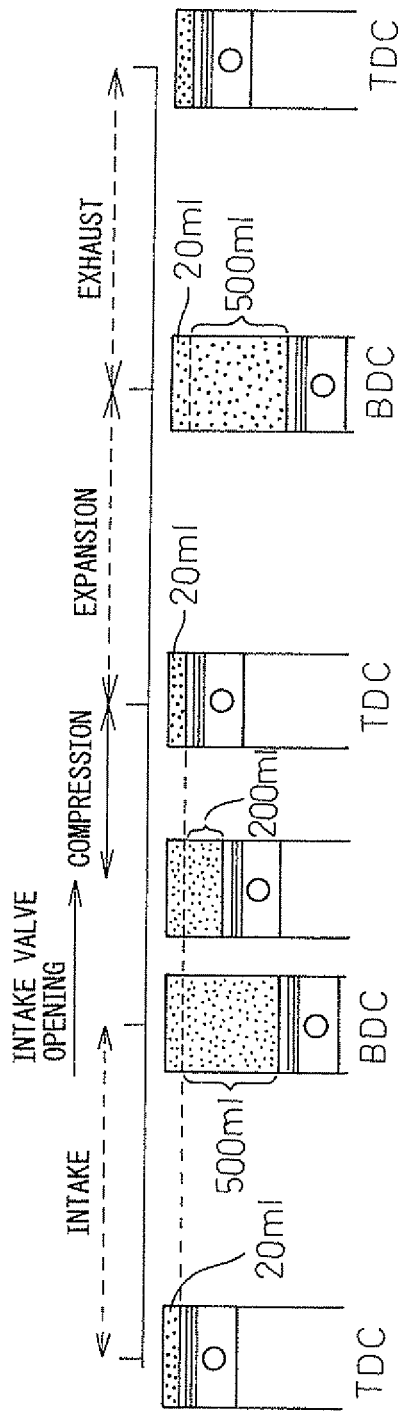

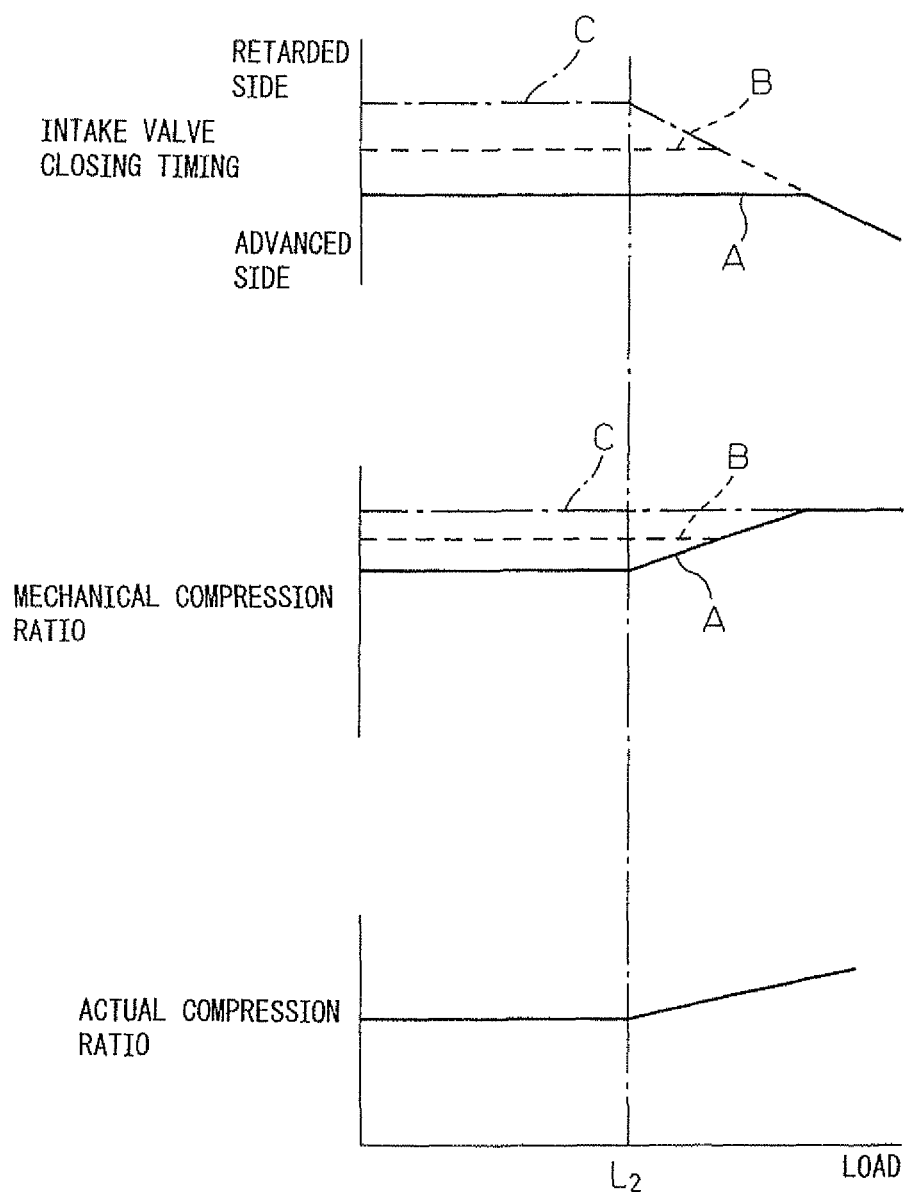

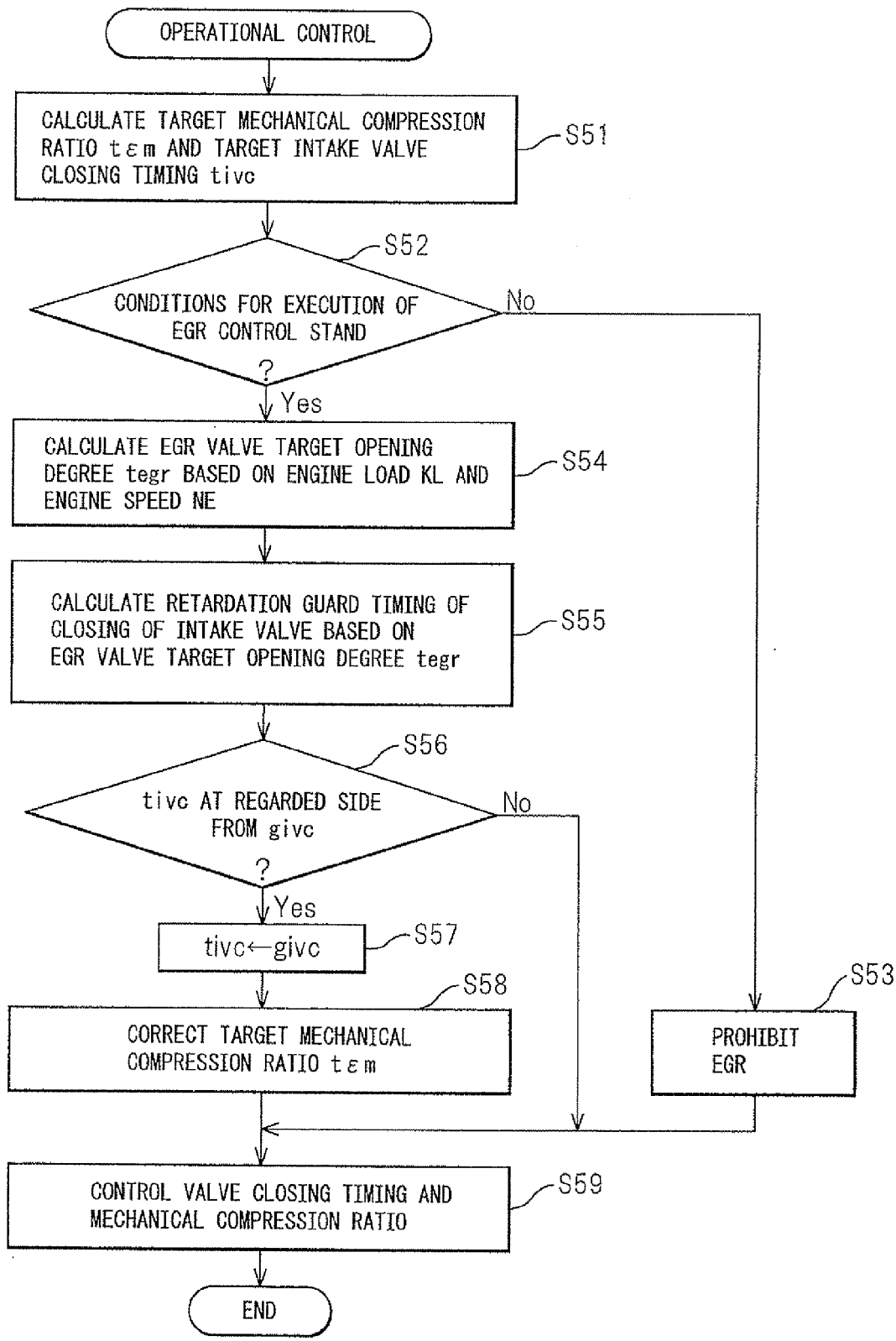

SPARK IGNITION TYPE INTERNAL COMBUSTION ENGINE

TECHNICAL FIELD

The present invention relates to a spark ignition type internal combustion engine.

BACKGROUND ART

The applicant proposed in Japanese Patent Publication (A) No. 2007-303423 a spark ignition type internal combustion engine which is provided with a variable compression ratio mechanism able to change a mechanical compression ratio and a variable closing timing mechanism able to change a closing timing of the intake valve, wherein at the time of engine low load operation, the mechanical compression ratio is raised compared with engine high load operation, to make an expansion ratio 20 or more.

In such a spark ignition type internal combustion engine, at the time of engine low load operation, the mechanical compression ratio (expansion ratio) is made 20 or more and the closing timing of the intake valve is made a timing away from intake bottom dead center so as to maintain the actual compression ratio relatively low compared with mechanical compression ratio, suppress the occurrence of knocking due to the actual compression ratio becoming higher, and while doing so realize an extremely high heat efficiency.

In this regard, if reducing the amount of intake air flowing into a combustion chamber by retarding the closing timing of the intake valve so as to move away from intake bottom dead center, part of the intake gas which is once sucked into the combustion chamber is pushed by the rising piston and blown back into an engine intake passage. The amount of blowback of the intake gas to the inside of the engine intake passage becomes greater the more the closing timing of the intake valve is retarded. Further, the strength of blowback of the intake gas to the inside of the engine intake passage becomes stronger the more the closing timing of the intake valve is retarded. In the spark ignition type internal combustion engine described in Japanese Patent Publication (A) No. 2007-303423, sometimes the closing timing of the intake valve is made extremely retarded. In such a case, the amount of blowback of the intake gas becomes extremely great, and the strength of blowback of the intake gas becomes extremely strong.

Under the conditions that the blowback of intake gas is large and strong in this way, if an exhaust gas recirculation (EGR) operation is carried out to make a part of the exhaust gas flow again into a combustion chamber, for example, the distribution of EGR gas among the cylinders will deteriorate, and the extent by which deposits stick will vary among cylinders.

That is, if the blowback of intake gas to the inside of the engine intake passage is large and strong, part of the intake gas will be blown back into the surge tank (that is, the collective part of the intake branch tubes). In this case, the part of the intake gas which was blown back into the surge tank will be sucked into not the original cylinder, but for example a cylinder which adjoins the original cylinder or a cylinder which is in the middle of a intake stroke when the intake gas is blown back into the inside of the surge tank.

If performing EGR at this time, EGR gas will be contained in the intake gas which is blown back into the engine intake passage. Therefore, if the blowback of intake gas to the inside of the engine intake passage is large and strong, part of the EGR gas will be sucked into not the original cylinder, but a cylinder which adjoins the original cylinder or a cylinder which is in the middle of a intake stroke when the intake gas is blown back into the inside of the surge tank. The amount of the EGR gas which is sucked into a cylinder different from the original cylinder changes depending on the flow of intake gas in the surge tank, the sequence by which the intake stroke is performed, etc. Therefore, there will be cylinders where the amount of EGR gas in the intake gas becomes larger and cylinders where the amount of EGR gas in the intake gas becomes smaller.

As a result, the amount of EGR gas will vary among the cylinders. Along with this, the air-fuel ratio will vary among the cylinders. Furthermore, the larger the amount of flow of EGR gas, the easier it is for deposits to stick to the wall surfaces of the intake ports. Therefore, in cylinders where the amount of EGR gas becomes large, the amount of deposits which stick to the wall surfaces of the intake ports will become greater, while in cylinders where the amount of EGR gas becomes small, the amount of deposits which stick to the wall surfaces of the intake ports will become smaller, and as a result, among the cylinders, the intake resistance to intake gas will differ. If variation occurs among the cylinders in the air-fuel ratio and intake resistance in this way, deterioration of the combustion and deterioration of the fuel efficiency will be invited.

DISCLOSURE OF INVENTION

Therefore, in view of the above problem, an object of the present invention is to suppress occurrence of variation among cylinders in air-fuel ratio and intake resistance, in an internal combustion engine, comprising a variable closing timing mechanism able to change a closing timing of an intake valve after intake bottom dead center and an EGR mechanism for making a part of exhaust gas again flow into a combustion chamber as EGR gas.

The present invention provides, as means for solving this problem, a spark ignition type internal combustion engine described in the claims.

In a first aspect of the present invention, the spark ignition type internal combustion engine comprises a variable closing timing mechanism able to change a closing timing of an intake valve after intake bottom dead center and an EGR mechanism making a part of exhaust gas flow again into a combustion chamber as EGR gas, wherein the amount of EGR gas is decreased when the closing timing of the intake valve is at the retarded side, compared with when it is at the advanced side.

In a second aspect of the present invention, the further the closing timing of the intake valve is to the retarded side, the more the amount of EGR gas is reduced.

In a third aspect of the present invention, the extent by which the amount of EGR gas is decreased is made smaller when the engine load is high compared to when low.

In a fourth aspect of the present invention, the extent by which the amount of EGR gas is decreased is made smaller when the engine speed is high compared to when low.

In a fifth aspect of the present invention, the extent by which the amount of EGR gas is decreased is made smaller when the temperature of the engine coolant is high compared to when low.

In a sixth aspect of the present invention, the extent by which the amount of EGR gas is decreased is made smaller when a concentration of ethanol in fuel is high compared to when low.

In a seventh aspect of the present invention, the amount of EGR gas to be fed into a combustion chamber is calculated based on not only the closing timing of the intake valve, but also the temperature of the engine coolant, and the above EGR mechanism is controlled to give the smaller of the amount of EGR gas between the amount of EGR gas which is calculated based on the closing timing of the intake valve and the amount of EGR gas which is calculated based on the temperature of the engine coolant.

In an eighth aspect of the present invention, the above EGR mechanism is provided with an EGR passage which communicates an engine exhaust passage and engine intake passage and with an EGR valve which is provided in the EGR passage, and the opening degree of the EGR valve is made smaller when making the amount of EGR gas decrease.

In a ninth aspect of the present invention, the above EGR valve is controlled in opening degree so that the amount of EGR gas which is returned into the surge tank becomes a certain amount or less.

In a 10th aspect of the present invention, there is provided a spark ignition type internal combustion engine comprising a variable closing timing mechanism able to change a closing timing of an intake valve after intake bottom dead center and an EGR mechanism which makes a part of the exhaust gas flow again into a combustion chamber as EGR gas, wherein the amount of intake gas which is fed into the combustion chamber is mainly controlled by changing the closing timing of the intake valve, and the closing timing of the intake valve is advanced when the amount of the EGR gas is large compared with when it is small.

In an 11th aspect of the present invention, the engine is further provided with a throttle valve which is arranged in the engine intake passage, wherein the amount of intake gas which is fed into a combustion chamber is controlled by changing an opening degree of the throttle valve in addition to changing the closing timing of the intake valve, and the above amount of EGR gas is made larger when the opening degree of the throttle valve is small compared with when it is large.

In a 12th aspect of the present invention, the extent by which the closing timing of the intake valve is advanced is made smaller when the engine load is high compared to when low.

In a 13th aspect of the present invention, the extent by which the closing timing of the intake valve is advanced is made smaller when the engine speed is high compared to when low.

In a 14th aspect of the present invention, the extent by which the closing timing of the intake valve is advanced is made smaller when the temperature of the engine coolant is high compared to when low.

In a 15th aspect of the present invention, the extent by which the closing timing of the intake valve is advanced is made smaller when a concentration of ethanol in the fuel is high compared to when low.

In a 16th aspect of the present invention, the engine is further provided with a variable compression ratio mechanism able to change a mechanical compression ratio, wherein the mechanical compression ratio is made higher at the time of engine low load operation compared with at the time of engine high load operation.

In a 17th aspect of the present invention, at the time of engine low load operation, the mechanical compression ratio is made the maximum mechanical compression ratio.

In a 18th aspect of the present invention, at the time of engine low load operation, the expansion ratio is made 20 or more.

Below, the present invention will be able to be understood more sufficiently from the attached drawings and the description of the preferred embodiments of the present invention.

BRIEF DESCRIPTION OF THE DRAWINGS

FIG. 7 is a view showing a relationship between a stoichiometric heat efficiency and expansion ratio.

FIG. 8A and FIG. 8B are views for explaining an ordinary cycle and a superhigh expansion ratio cycle.

FIG. 22 shows various changes in the closing timing of the intake valve 7, mechanical compression ratio, and actual compression ratio in accordance with the engine load in a region of a relatively low engine load.

FIG. 23 is a flowchart showing a control routine of operational control in a fourth embodiment.

BEST MODE FOR CARRYING OUT THE INVENTION

Figure 1:
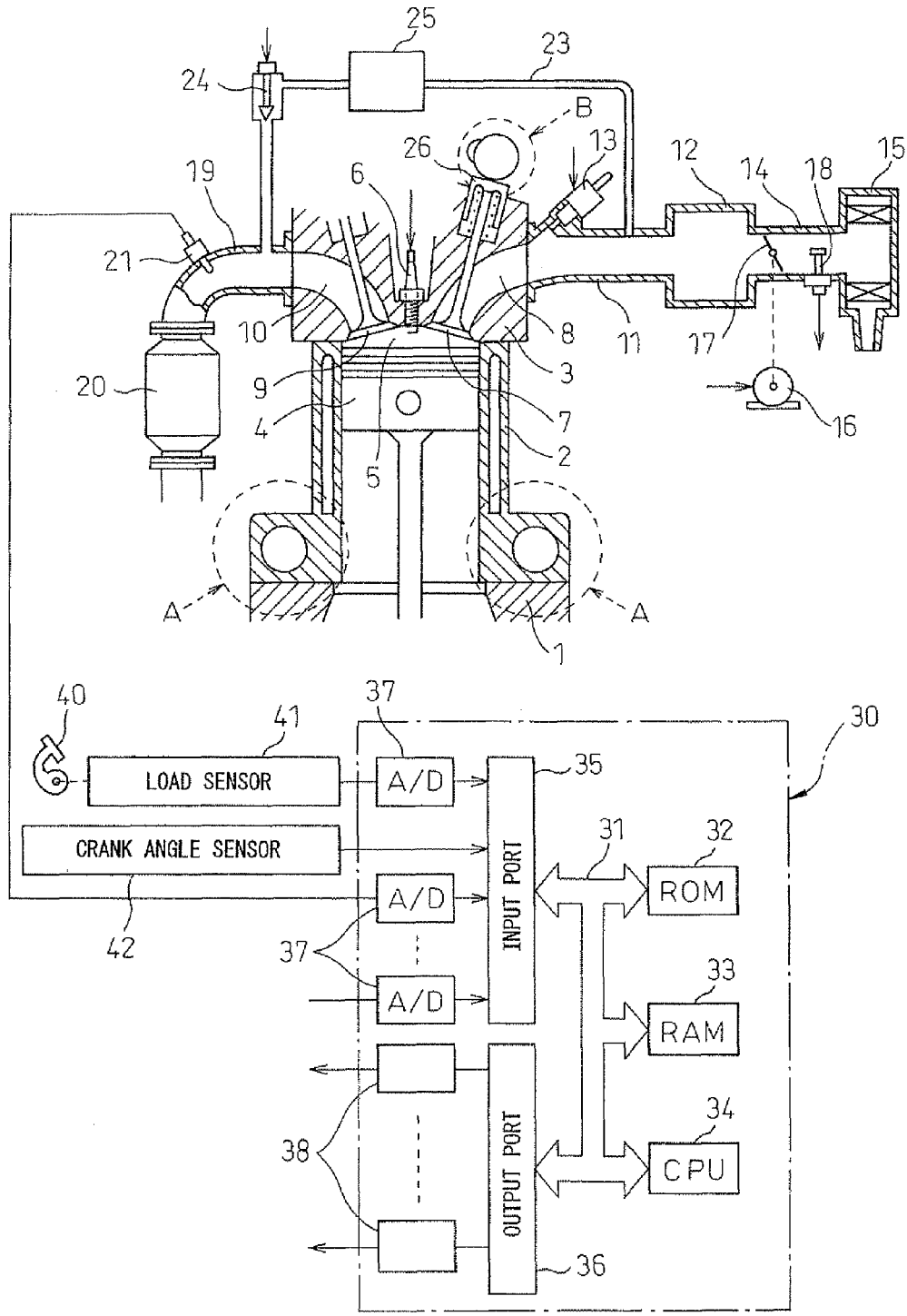
FIG. 1 is an overview of a spark ignition type internal combustion engine.

Below, embodiments of the present invention will be explained with reference to the drawings. Note that the same or similar components in the drawings are assigned the same notations.

FIG. 1 is a side cross-sectional view of a spark ignition type internal combustion engine.

Referring to FIG. 1, 1 indicates a crank case, 2 a cylinder block, 3 a cylinder head, 4 a piston, 5 a combustion chamber, 6 a spark plug arranged at the top center of the combustion chamber 5, 7 an intake valve, 8 an intake port, 9 an exhaust valve, and 10 an exhaust port. The intake port 8 is connected through an intake branch tube 11 to a surge tank 12, while each intake branch tube 11 is provided with a fuel injector 13 for injecting fuel toward a corresponding intake port 8. Note that each fuel injector 13 may be arranged at each combustion chamber 5 instead of being attached to each intake branch tube 11.

The surge tank 12 is connected through an intake duct 14 to an air cleaner 15. The intake duct 14 is provided inside it with a throttle valve 17 driven by an actuator 16 and an intake air amount detector 18 using for example a hot wire. On the other hand, the exhaust port 10 is connected through an exhaust manifold 19 to a catalytic converter 20 housing for example a three-way catalyst. The exhaust manifold 19 is provided inside it with an air-fuel ratio sensor 21.

The exhaust manifold 19 and the intake branch tube 11 (or the intake port 8) are connected with each other through an EGR passage 23 for recirculated exhaust gas (below, referred to as "EGR gas"). Inside this EGR passage 23, an EGR control valve 24 is arranged. Further, around the EGR passage 23, an EGR cooling device 25 for cooling the EGR gas flowing through the inside of the EGR passage 23 is arranged. In the internal combustion engine shown in FIG. 1, engine coolant is led into the EGR cooling device 25, and the engine coolant is used to cool the EGR gas. Note that, in the following explanation, the intake port 8, intake branch tube 11, surge tank 12, and intake duct 14 are referred to all together as the "engine intake passage".

On the other hand, in the embodiment shown in FIG. 1, at a connecting part of the crank case 1 and cylinder block 2, a variable compression ratio mechanism A is provided which can change a relative position of the crank case 1 and cylinder block 2 in the cylinder axial direction so as to change the volume of a combustion chamber 5 when a piston 4 is positioned at compression top dead center. Furthermore, a variable valve timing mechanism B is provided which can change a closing timing of an intake valve 7.

The electronic control unit 30 is comprised of a digital computer provided with components connected with each other through a bidirectional bus 31 such as a ROM (read only memory) 32, RAM (random access memory) 33, CPU (microprocessor) 34, input port 35, and output port 36. The output signal of the intake air amount detector 18 and the output signal of the air-fuel ratio sensor 21 are input through corresponding AD converters 37 to the input port 35. Further, the accelerator pedal 40 is connected to a load sensor 41 generating an output voltage proportional to the amount of depression of the accelerator pedal 40. The output voltage of the load sensor 41 is input through a corresponding AD converter 37 to the input port 35. Further, the input port 35 is connected to a crank angle sensor 42 generating an output pulse every time the crankshaft rotates by for example 30°. On the other hand, the output port 36 is connected through the corresponding drive circuits 38 to a spark plug 6, fuel injector 13, throttle valve drive actuator 16, EGR control valve 24, and variable compression ratio mechanism A and variable valve timing mechanism B.

Figure 2:
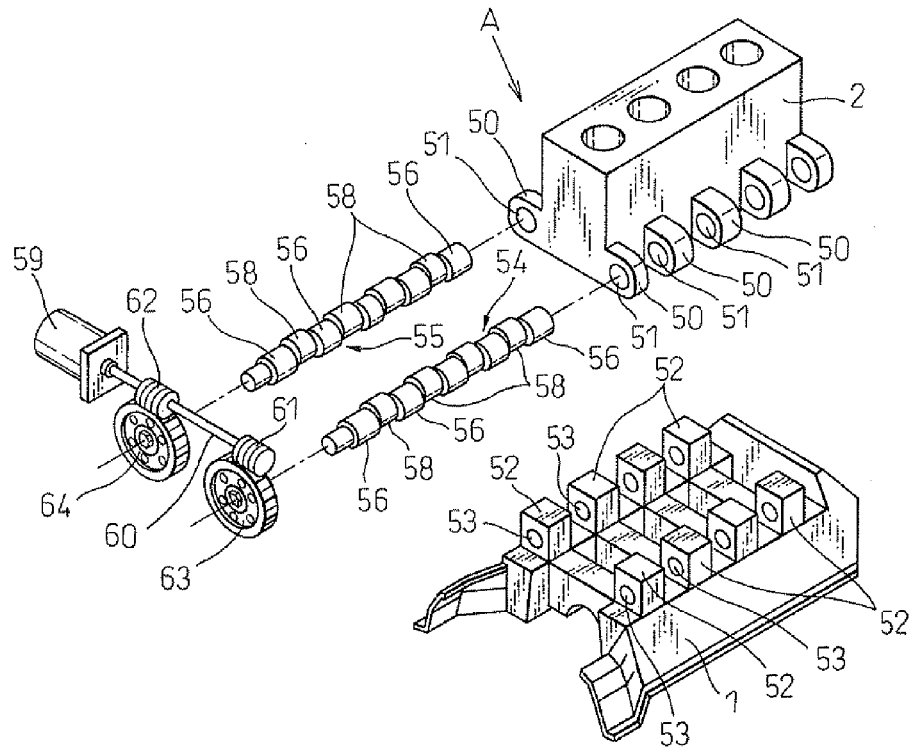
FIG. 2 is a disassembled perspective view of a variable compression ratio mechanism.
Figure 3A:
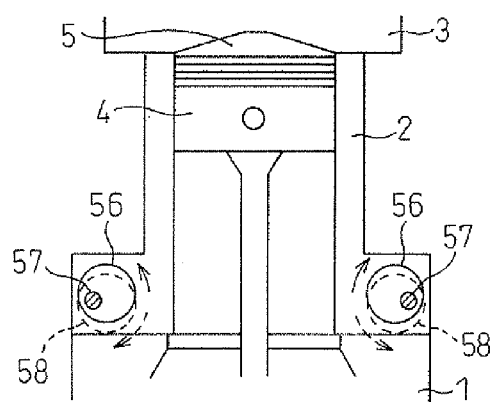
FIG. 3A and FIG. 3B are side cross-sectional views of a schematically illustrated internal combustion engine.
Figure 3B:
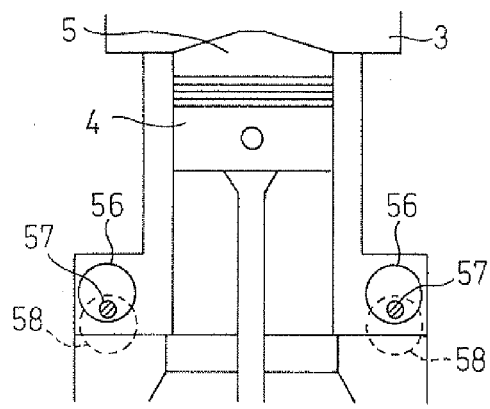

FIG. 2 is an exploded perspective view of the variable compression ratio mechanism A shown in FIG. 1, while FIG. 3A and FIG. 3B are side cross-sectional views of the internal combustion engine schematically illustrated. Referring to FIG. 2, at the bottom of the two side walls of the cylinder block 2, a plurality of projecting parts 50 separated from each other by a certain distance are formed. Each projecting part 50 is formed with a circular cross-section cam insertion hole 51. On the other hand, the top surface of the crank case 1 is formed with a plurality of projecting parts 52 separated from each other by a certain distance and fitting between the corresponding projecting parts 50. These projecting parts 52 are also formed with circular cross-section cam insertion holes 53.

As shown in FIG. 2, a pair of cam shafts 54, 55 is provided. Each of the cam shafts 54, 55 has circular cams 56 fixed on it able to be rotatably inserted in the cam insertion holes 51 at every other position. These circular cams 56 are coaxial with the axes of rotation of the cam shafts 54, 55. On the other hand, between the circular cams 56, as shown by the hatching in FIG. 3A and FIG. 3B, extend eccentric shafts 57 arranged eccentrically with respect to the axes of rotation of the cam shafts 54, 55. Each eccentric shaft 57 has other circular cams 58 rotatably attached to it eccentrically. As shown in FIG. 2, these circular cams 58 are arranged between the circular cams 56. These circular cams 58 are rotatably inserted in the corresponding cam insertion holes 53.

When the circular cams 56 fastened to the cam shafts 54, 55 are rotated in opposite directions as shown by the solid line arrows in FIG. 3A from the state shown in FIG. 3A, the eccentric shafts 57 move toward the bottom center, so the circular cams 58 rotate in the opposite directions from the circular cams 56 in the cam insertion holes 53 as shown by the broken line arrows in FIG. 3A. As shown in FIG. 3B, when the eccentric shafts 57 move toward the bottom center, the centers of the circular cams 58 move to below the eccentric shafts 57.

As will be understood from a comparison of FIG. 3A and FIG. 3B, the relative positions of the crank case 1 and cylinder block 2 are determined by the distance between the centers of the circular cams 56 and the centers of the circular cams 58. The larger the distance between the centers of the circular cams 56 and the centers of the circular cams 58, the further the cylinder block 2 from the crank case 1. If the cylinder block 2 moves away from the crank case 1, the volume of the combustion chamber 5 when the piston 4 is positioned at compression top dead center increases, therefore by making the cam shafts 54, 55 rotate, the volume of the combustion chamber 5 when the piston 4 is positioned at compression top dead center can be changed.

As shown in FIG. 2, to make the cam shafts 54, 55 rotate in opposite directions, the shaft of a drive motor 59 is provided with a pair of worm gears 61, 62 with opposite thread directions. Gears 63, 64 engaging with these worm gears 61, 62 are fastened to ends of the cam shafts 54, 55. In this embodiment, the drive motor 59 may be driven to change the volume of the combustion chamber 5 when the piston 4 is positioned at compression top dead center over a broad range. Note that the variable compression ratio mechanism A shown from FIG. 1 to FIG. 3 shows an example. Any type of variable compression ratio mechanism may be used.

Figure 4:
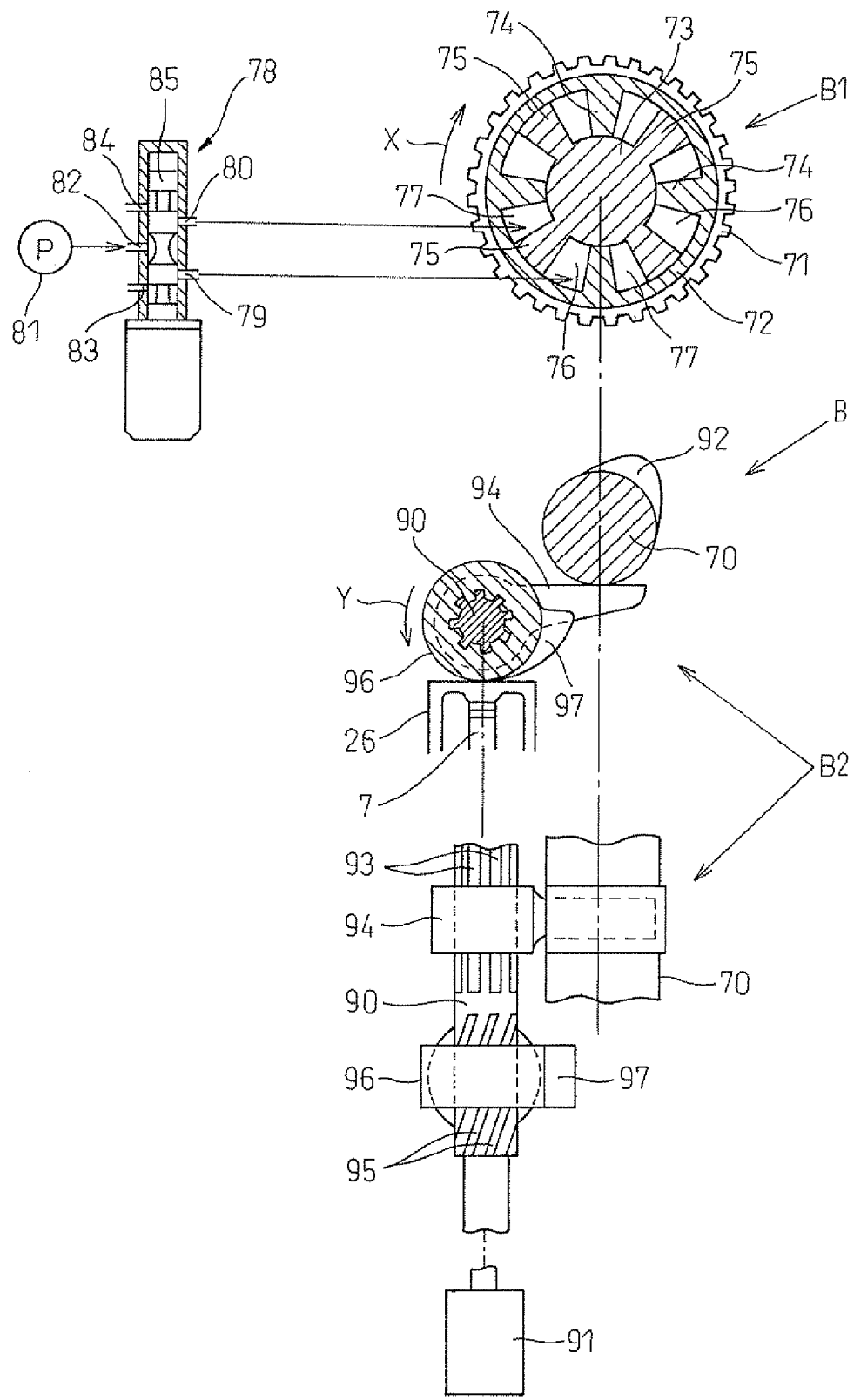
FIG. 4 is a view showing a variable valve timing mechanism.

On the other hand, further, FIG. 4 shows an intake valve variable mechanism B attached to the cam shaft 70 for driving the intake valve 7 in FIG. 1. As shown in FIG. 4, the intake variable valve mechanism B is comprised of a cam phase changer B1 attached to one end of the cam shaft 70 and changing the phase of the cam of the cam shaft 70, and a cam actuation angle changer B2 arranged between the cam shaft 70 and the valve lifter 26 of the intake valve 7 and changing the actuation angle (working angle) of the cams of the cam shaft 70 to different actuation angles for transmission to the intake valve 7. Note that FIG. 4 is a side sectional view and plan view of the cam actuation angle changer B2.

First, explaining the cam phase changer B1 of the intake variable valve mechanism B, this cam phase changer B1 is provided with a timing pulley 71 made to rotate by an engine crank shaft through a timing belt in the arrow direction, a cylindrical housing 72 rotating together with the timing pulley 71, a rotation shaft 73 able to rotate together with a cam shaft 70 and rotate relative to the cylindrical housing 72, a plurality of partitions 74 extending from an inside circumference of the cylindrical housing 72 to an outside circumference of the rotation shaft 73, and vanes 75 extending between the partitions 74 from the outside circumference of the rotation shaft 73 to the inside circumference of the cylindrical housing 72, the two sides of the vanes 75 formed with advancing use hydraulic chambers 76 and retarding use hydraulic chambers 77.

The feed of working oil to the hydraulic chambers 76, 77 is controlled by a working oil feed control valve 78. This working oil feed control valve 78 is provided with hydraulic ports 79, 80 connected to the hydraulic chambers 76, 77, a feed port 82 for feeding working oil discharged from a hydraulic pump 81, a pair of drain, ports 83, 84, and a spool valve 85 for controlling connection and disconnection of the ports 79, 80, 82, 83, 84.

To advance the phase of the cams of the cam shaft 70, the spool valve 85 is made to move to downward in FIG. 4, working oil fed from the feed port 82 is fed through the hydraulic port 79 to the advancing use hydraulic chambers 76, and working oil in the retarding use hydraulic chambers 77 is drained from the drain port 84. At this time, the rotation shaft 73 is made to rotate relative to the cylindrical housing 72 in the arrow X-direction.

As opposed to this, to retard the phase of the cam of the cam shaft 70, the spool valve 85 is made to move upward in FIG. 4, working oil fed from the feed port 82 is fed through the hydraulic port 80 to the retarding use hydraulic chambers 77, and working oil in the advancing use hydraulic chambers 76 is drained from the drain port 83. At this time, the rotation shaft 73 is made to rotate relative to the cylindrical housing 72 in the direction opposite to the arrows X.

Figure 5A:
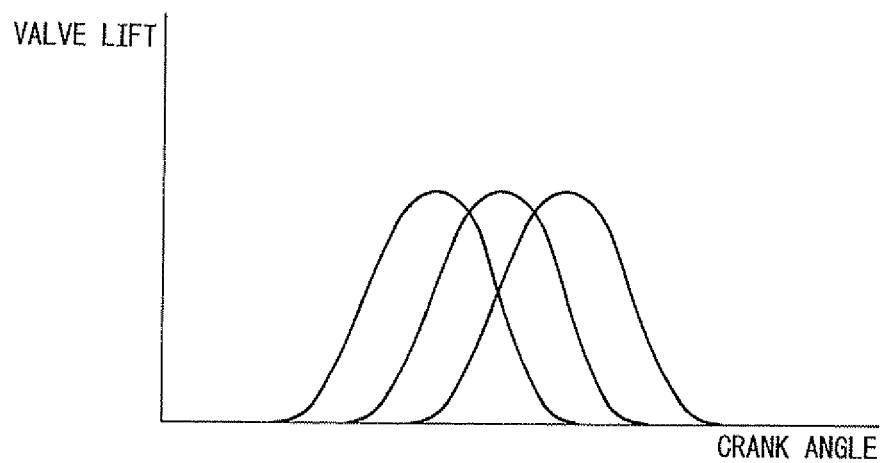
FIG. 5A and FIG. 5B are views showing lift amounts of an intake valve and exhaust valve.

When the rotation shaft 73 is made to rotate relative to the cylindrical housing 72, if the spool valve 85 is returned to the neutral position shown in FIG. 4, the operation for relative rotation of the rotation shaft 73 is ended, and the rotation shaft 73 is held at the relative rotational position at that time. Therefore, it is possible to use the cam phase changer B1 so as to advance or retard the phase of the cam of the cam shaft 70 by exactly the desired amount as shown in FIG. 5A. That is, the cam phase changer B1 can freely advance or retard the opening timing of the intake valve 7.

Next, explaining the cam actuation angle changer B2 of the variable valve timing mechanism B, this cam actuation angle changer B2 is provided with a control rod 90 arranged in parallel with the cam shaft 70 and made to move by an actuator 91 in the axial direction, an intermediate cam 94 engaging with a cam 92 of the cam shaft 70 and slidably fitting with a spline 93 formed on the control rod 90 and extending in the axial direction thereof, and a pivoting cam 96 engaging with a valve lifter 26 for driving the intake valve 7 and slidably fitting with a spline 95 extending in a spiral and formed on the control rod 90. The pivoting cam 96 is formed with a cam 97.

When the cam shaft 70 rotates, the cam 92 causes the intermediate cam 94 to pivot by exactly a constant angle at all times. At this time, the pivoting cam 96 is also made to pivot by exactly a constant angle. On the other hand, the intermediate cam 94 and pivoting cam 96 are supported not movably in the axial direction of the control rod 90, therefore when the control rod 90 is made to move by the actuator 91 in the axial direction, the pivoting cam 96 is made to rotate relative to the intermediate cam 94.

Figure 5B:
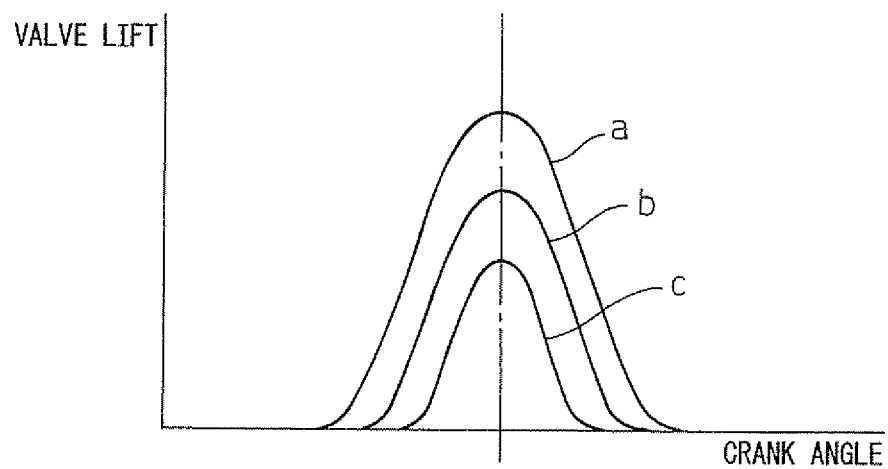

If the cam 97 of the pivoting cam 96 starts to engage the valve lifter 26 when the cam 92 of the cam shaft 70 starts to engage with the intermediate cam 94 due to the relative rotational positional relationship between the intermediate cam 94 and pivoting cam 96, as shown by a. in FIG. 5B, the opening time period and amount of lift of the intake valve 7 become maximum. As opposed to this, when the actuator 91 is used to make the pivoting cam 96 rotate relative to the intermediate cam 94 in the arrow Y-direction of FIG. 4, the cam 92 of the cam shaft 70 engages with the intermediate cam 94, then after a while the cam 97 of the pivoting cam 96 engages with the valve lifter 26. In this case, as shown by b in FIG. 5B, the opening time period and amount of lift of the intake valve 7 become smaller than a.

When the pivoting cam 96 is made to further rotate relative to the intermediate cam 94 in the arrow Y-direction of FIG. 4, as shown by c in FIG. 5B, the opening time period and amount of lift of the intake valve 7 become further smaller. That is, by using the actuator 91 to change the relative rotational position of the intermediate cam 94 and pivoting cam 96, the opening time period of the intake valve 7 can be freely changed. However, in this case, the amount of the lift of the intake valve 7 becomes smaller the shorter the opening time of the intake valve 7.

The cam phase changer B1 can be used to freely change the opening timing of the intake valve 7 and the cam actuation angle changer B2 can be used to freely change the opening time period of the intake valve 7 in this way, so both the cam phase changer B1 and cam actuation angle changer B2, that is, the intake variable valve mechanism B, may be used to freely change the opening timing and opening time period of the intake valve 7, that is, the opening timing and closing timing of the intake valve 7.

Note that the intake variable valve mechanism B shown in FIGS. 1 and 4 shows an example. It is also possible to use various types of variable valve mechanism other than the example shown in FIGS. 1 and 4. In particular, in the embodiment according to the present invention, so long as a closing timing mechanism which can change the closing timing of an intake valve 7, any type of mechanism may be used. Further, for the exhaust valve 9 as well, a variable valve timing mechanism similar to the variable valve timing mechanism B of the intake valve 7 may be provided.

Figure 6A:
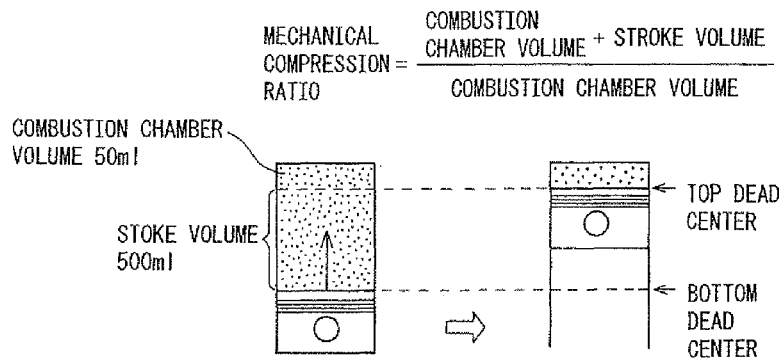
FIG. 6A to FIG. 6C are views for explaining a mechanical compression ratio, actual compression ratio, and expansion ratio.
Figure 6B:
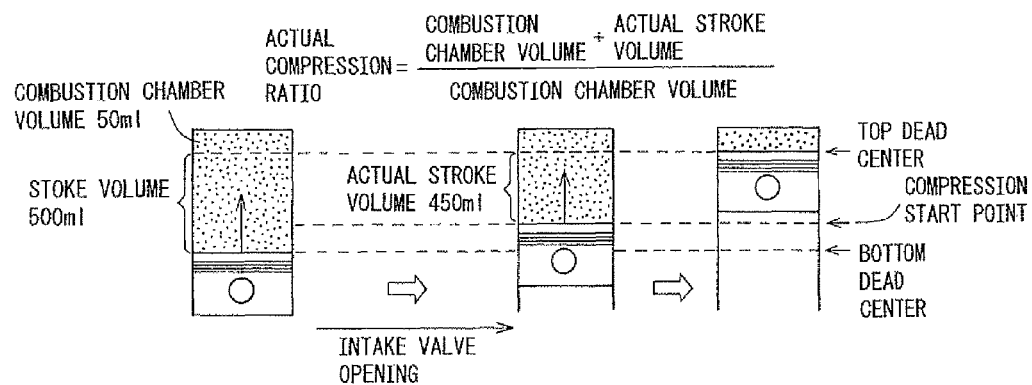
Figure 6C:
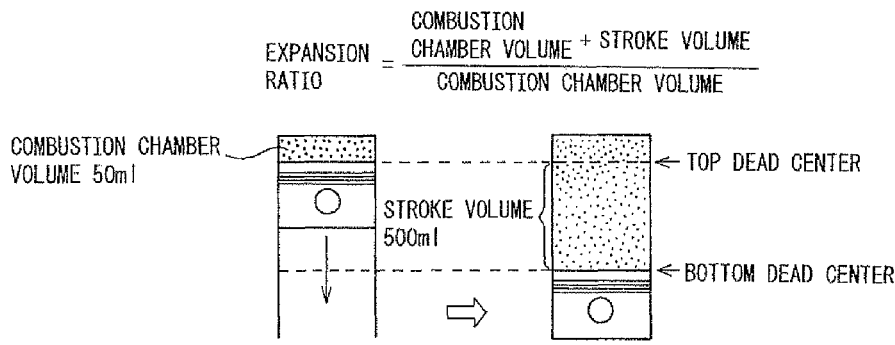

Next, the meaning of the terms used in the present application will be explained with reference to FIG. 6A to FIG. 6C. Note that FIG. 6A to FIG. 6C show for explanatory purposes an engine with a volume of the combustion chambers of 50 ml and a stroke volume of the piston of 500 ml. In these FIG. 6A to FIG. 6C, the combustion chamber volume shows the volume of the combustion chamber when the piston is at compression top dead center.

FIG. 6A explains the mechanical compression ratio. The mechanical compression ratio is a value determined mechanically from the stroke volume of the piston and combustion chamber volume at the time of a compression stroke. This mechanical compression ratio is expressed by (combustion chamber volume+stroke volume)/combustion chamber volume. In the example shown in FIG. 6A, this mechanical compression ratio becomes (50 ml+500 ml)/50 ml=11.

FIG. 6B explains the actual compression ratio. This actual compression ratio is a value determined from the combustion chamber volume and the actual stroke volume of the piston from when the compression action is actually started to when the piston reaches top dead center. This actual compression ratio is expressed by (combustion chamber volume+actual stroke volume)/combustion chamber volume. That is, as shown in FIG. 6B, even if the piston starts to rise in the compression stroke, no compression action is performed while the intake valve is opened. The actual compression action is started after the intake valve closes. Therefore, the actual compression ratio is expressed as above using the actual stroke volume. In the example shown in FIG. 6B, the actual compression ratio becomes (50 ml+450 ml)/50 ml=10.

FIG. 6C explains the expansion ratio. The expansion ratio is a value determined from the stroke volume of the piston at the time of an expansion stroke and the combustion chamber volume. This expansion ratio is expressed by the (combustion chamber volume+stroke volume)/combustion chamber volume. In the example shown in FIG. 7A, this expansion ratio becomes (50 ml+500 ml)/50 ml=11.

Next, the most basic features of the present invention will be explained with reference to FIG. 7, FIG. 8A and FIG. 8B. Note that FIG. 7 shows the relationship between the theoretical thermal efficiency and the expansion ratio, while FIG. 8A and FIG. 83 show a comparison between the ordinary cycle and superhigh expansion ratio cycle used selectively in accordance with the load in the present invention.

FIG. 8A shows the ordinary cycle wherein the intake valve closes near the bottom dead center and the compression action by the piston is started from near substantially compression bottom dead center. In the example shown in this FIG. 8A as well, in the same way as the examples shown in FIGS. 6A to 6C, the combustion chamber volume is made 50 ml, and the stroke volume of the piston is made 500 ml. As will be understood from FIG. 8A, in an ordinary cycle, the mechanical compression ratio is (50 ml+500 ml)/50 ml=11, the actual compression ratio is also about 11, and the expansion ratio also becomes (50 ml+500 ml)/50 ml=11. That is, in an ordinary internal combustion engine, the mechanical compression ratio and actual compression ratio and the expansion ratio become substantially equal.

The solid line in FIG. 7 shows the change in the theoretical thermal efficiency in the case where the actual compression ratio and expansion ratio are substantially equal, that is, in the ordinary cycle. In this case, it is learned that the larger the expansion ratio, that is, the higher the actual compression ratio, the higher the theoretical thermal efficiency. Therefore, in an ordinary cycle, to raise the theoretical thermal efficiency, the actual compression ratio should be made higher. However, due to the restrictions on the occurrence of knocking at the time of engine high load operation, the actual compression ratio can only be raised even at the maximum to about 12, accordingly, in an ordinary cycle, the theoretical thermal efficiency cannot be made sufficiently high.

On the other hand, under this situation, the inventors strictly differentiated between the mechanical compression ratio and actual compression ratio and studied the theoretical thermal efficiency and as a result discovered that in the theoretical thermal efficiency, the expansion ratio is dominant, and the theoretical thermal efficiency is not affected much at all by the actual compression ratio. That is, if raising the actual compression ratio, the explosive force rises, but compression requires a large energy, accordingly even if raising the actual compression ratio, the theoretical thermal efficiency will not rise much at all.

As opposed to this, if increasing the expansion ratio, the longer the period during which a force acts pressing down the piston at the time of the expansion stroke, and therefore the longer the time that the piston gives a rotational force to the crankshaft. Therefore, the larger the expansion ratio is made, the higher the theoretical thermal efficiency becomes. The broken line $\epsilon$=10 in FIG. 7 shows the theoretical thermal efficiency in the case of fixing the actual compression ratio at 10 and raising the expansion ratio in that state. It is learned that the amount of rise of the theoretical thermal efficiency when raising the expansion ratio in the state where the actual compression ratio is maintained at a low value in the above way and the amount of rise of the theoretical thermal efficiency in the case where the actual compression ratio is increased along with the expansion ratio as shown by the solid line of FIG. 7 will not differ that much.

If the actual compression ratio is maintained at a low value in this way, knocking will not occur, therefore if raising the expansion ratio in the state where the actual compression ratio is maintained at a low value, the occurrence of knocking can be prevented and the theoretical thermal efficiency can be greatly raised. FIG. 8B shows an example of the case when using the variable compression ratio mechanism A and variable valve timing mechanism B to maintain the actual compression ratio at a low value and raise the expansion ratio.

Referring to FIG. 8B, in this example, the variable compression ratio mechanism A is used to lower the combustion chamber volume from 50 ml to 20 ml. On the other hand, the variable valve timing mechanism B is used to retard the closing timing of the intake valve until the actual stroke volume of the piston changes from 500 ml to 200 ml. As a result, in this example, the actual compression ratio becomes (20 ml+200 ml)/20 ml=11 and the expansion ratio becomes (20 ml+500 ml)/20 ml=26. In the ordinary cycle shown in FIG. 8A, as explained above, the actual compression ratio is about 11 and the expansion ratio is 11. Compared with this case, in the case shown in FIG. 8B, it is learned that only the expansion ratio is raised to 26. This is the reason that it is called the "superhigh expansion ratio cycle".

As explained above, generally speaking, in an internal combustion engine, the lower the engine load, the worse the thermal efficiency, therefore to improve the thermal efficiency at the time of vehicle operation, that is, to improve the fuel consumption, it becomes necessary to improve the thermal efficiency at the time of engine low load operation. On the other hand, in the superhigh expansion ratio cycle shown in FIG. 8B, the actual stroke volume of the piston at the time of the compression stroke is made smaller, so the amount of intake air which can be sucked into the combustion chamber 5 becomes smaller, therefore this superhigh expansion ratio cycle can only be employed when the engine load is relatively low. Therefore, in the present invention, at the time of engine low load operation, the superhigh expansion ratio cycle shown in FIG. 8B is set, while at the time of engine high load operation, the ordinary cycle shown in FIG. 8A is set.

Next, the operational control as a whole will be explained while referring to FIG. 9.

Figure 9:
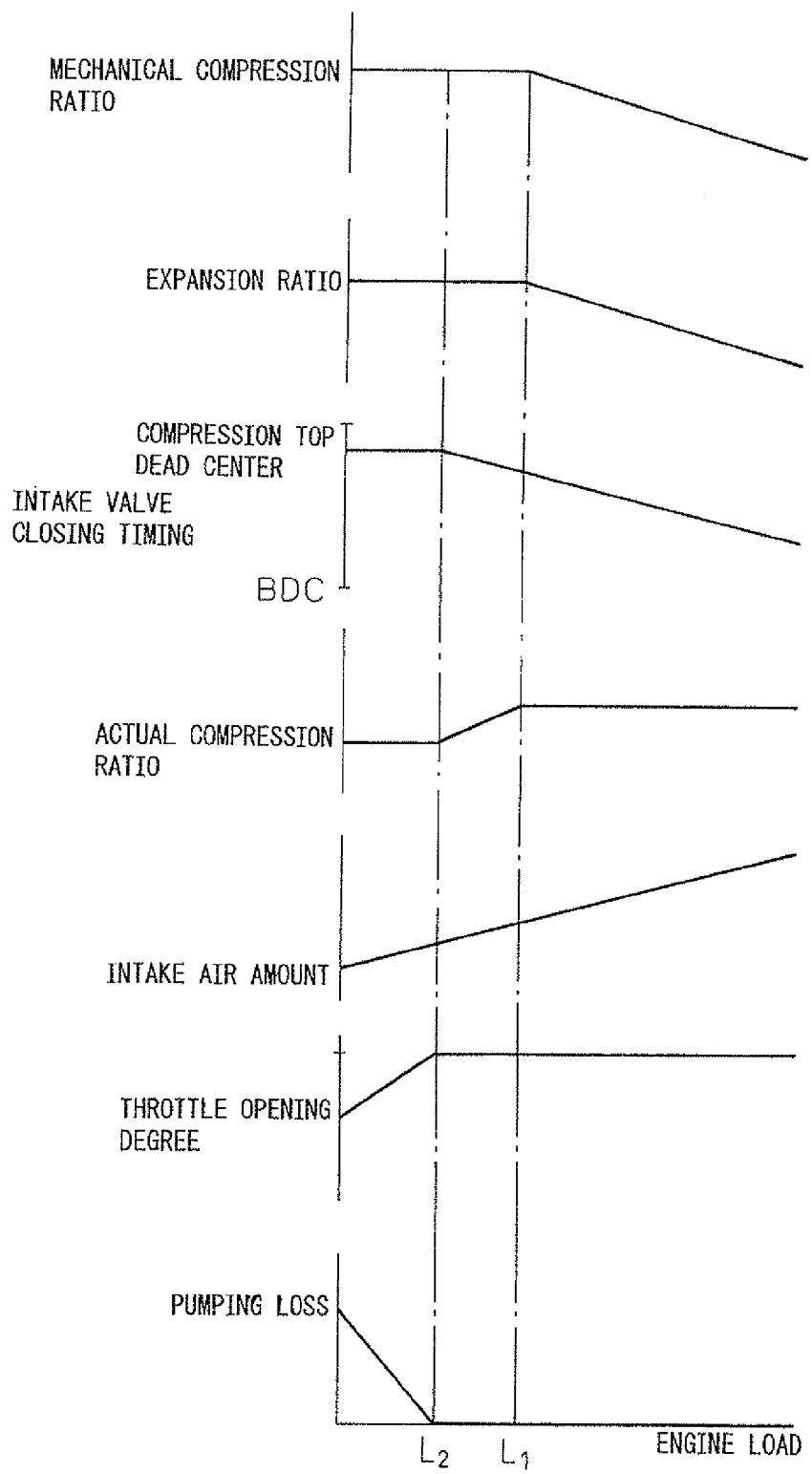
FIG. 9 is a view showing changes in a mechanical compression ratio, etc. in accordance with the engine load.

FIG. 9 shows the various changes in parameters in accordance with the engine load at a certain engine speed such as the mechanical compression ratio, expansion ratio, the closing timing of the intake valve 7, the actual compression ratio, the amount of intake air, the opening degree of the throttle valve 17, and the pumping loss. Note that, in this embodiment according to the present invention, the three-way catalyst in the catalytic converter 20 is made able to simultaneously reduce the unburned HC, CO, and $NO_X$ in the exhaust gas by the average air-fuel ratio in the combustion chamber 5 normally being feedback controlled to the stoichiometric air-fuel ratio based on the output signal of the air-fuel ratio sensor 21.

Now then, as explained above, at the time of engine high load operation, the ordinary cycle shown in FIG. 8A is executed. Therefore, as shown in FIG. 9, at this time, the mechanical compression ratio is made lower, so the expansion ratio is low and the closing timing of the intake valve 7 is advanced. Further, at this time, the amount of intake air is large. At this time, the opening degree of the throttle valve 17 is held at fully open or substantially fully open, so the pumping loss becomes zero.

On the other hand, as shown in FIG. 9, if the engine load becomes lower, along with this, the closing timing of the intake valve 7 is retarded so as to reduce the amount of intake air. Further, at this time, as shown in FIG. 9, the mechanical compression ratio is increased as the engine load becomes lower so that the actual compression ratio is held substantially constant. Therefore, as the engine load becomes lower, the expansion ratio is also increased. Note that, at this time as well, the throttle valve 17 is held at the fully open or substantially fully open state, therefore, the amount of intake air which is fed into a combustion chamber 5 is controlled not by relying on the throttle valve 17, but by changing the closing timing of the intake valve 7. At this time as well, the pumping loss becomes zero.

In this way, when the engine load becomes lower from the engine high load operation state, under a substantially constant actual compression ratio, the mechanical compression ratio is made to increase as the amount of intake air is decreased. That is, the volume of a combustion chamber 5 when the piston 4 reaches compression top dead center is reduced in proportion to the decrease in the amount of intake air. Therefore, the volume of the combustion chamber 5 when the piston 4 reaches compression top dead center changes proportionally to the amount of intake air. Note that, at this time, the air-fuel ratio in the combustion chamber 5 is the stoichiometric air-fuel ratio, so the volume of the combustion chamber 5 when the piston 4 reaches compression top dead center changes in proportion to the amount of fuel.

If the engine load becomes further lower, the mechanical compression ratio is further increased. If the engine load falls to the medium load $L_1$ close to low load, the mechanical compression ratio reaches the limit mechanical compression ratio, which corresponds to the structural limit of a combustion chamber 5. If the mechanical compression ratio reaches the limit mechanical compression ratio, in the region of a load lower than the engine load $L_1$ when the mechanical compression ratio reaches the limit mechanical compression ratio, the mechanical compression ratio is held at the limit mechanical compression ratio. Therefore, at the time of low load side of engine medium load operation and at the time of engine low load operation, the mechanical compression ratio becomes maximum and the expansion ratio also becomes maximum. Explained in another way, at the time of low load side of engine medium load operation and at the time of engine low load operation, the mechanical compression ratio is made maximum so that the maximum expansion ratio is obtained.

On the other hand, in the embodiment shown in FIG. 9, even if the engine load becomes lower than the closing timing of the intake valve 7 is retarded more as the engine load becomes lower. If the engine load falls to $L_2$, the closing timing of the intake valve 7 becomes the limit closing timing able to control the amount of intake air which is fed into the combustion chamber 5. If the closing timing of the intake valve 7 reaches the limit closing timing, in the region of a load lower than the engine load $L_2$ when the closing timing of the intake valve 7 reaches the limit closing timing, the closing timing of the intake valve 7 is held at the limit closing timing.

If the closing timing of the intake valve 7 is held at the limit closing timing, the amount of intake air can no longer be controlled by the change of the closing timing of the intake valve 7. In the embodiment shown in FIG. 9, at this time, that is, in the region of a load lower than the engine load $L_2$ when the closing timing of the intake valve 7 reaches the limit closing timing, the throttle valve 17 is used to control the amount of intake air which is fed into the combustion chamber 5. However, if using the throttle valve 17 to control the amount of intake air, as shown in FIG. 9, the pumping loss is increased.

Note that, to prevent such pumping loss from occurring, in the region of a load lower than the engine load $L_2$ when the closing timing of the intake valve 7 reaches the limit closing timing, it is also possible to increase the air-fuel ratio the more the engine load becomes lower in the state holding the throttle valve 17 fully open or substantially fully open. At this time, the fuel injector 13 is preferably arranged inside of the combustion chamber 5 to perform layered combustion.

Further, in the region of a load lower than the engine load $L_1$ when the mechanical compression ratio reaches the limit mechanical compression ratio, it is not necessarily required to control the closing timing of the intake valve 7 and the opening degree of the throttle valve 17 like as explained above. In this operating region, it is sufficient to control one or the other of the closing timing of the intake valve 17 and the opening degree of the throttle valve 17 so as to control the amount of intake air.

On the other hand, as shown in FIG. 9, when the engine load is higher than $L_1$, that is, at the time of high load side of engine medium load operation and at the time of engine high load operation, the actual compression ratio is maintained at substantially the same actual compression ratio for the same engine speed. As opposed to this, when the engine load is lower than $L_1$, that is, when the mechanical compression ratio is held at the limit mechanical compression ratio, the actual compression ratio is determined by the closing timing of the intake valve 7. If the engine load is between $L_1$ and $L_2$, the actual compression ratio falls by the closing timing of the intake valve 7 being retarded. If the engine load is in the operating region lower than $L_2$, the actual compression ratio is held constant by the closing timing of the intake valve 7 being held at the limit closing timing.

Note that, if the engine speed becomes higher, the air-fuel mixture in the combustion chamber 5 becomes disturbed and knocking becomes harder to occur. Therefore, in this embodiment according to the present invention, the higher the engine speed becomes, the higher the actual compression ratio is made.

On the other hand, as explained above, in the superhigh expansion ratio cycle shown in FIG. 8B, the expansion ratio is made 26. This expansion ratio is preferably as high as possible, but as will be understood from FIG. 7, even with respect to the actually feasible lower limit actual compression ratio $\epsilon=5$, if 20 or more, a considerably high stoichiometric heat efficiency can be obtained. Therefore, in the present invention, the variable compression ratio mechanism A is formed so that the expansion ratio becomes 20 or more.

Further, in the example shown in FIG. 9, the mechanical compression ratio is made to change continuously in accordance with the engine load. However, the mechanical compression ratio may also be made to change in stages in accordance with the engine load.

Figure 10A:
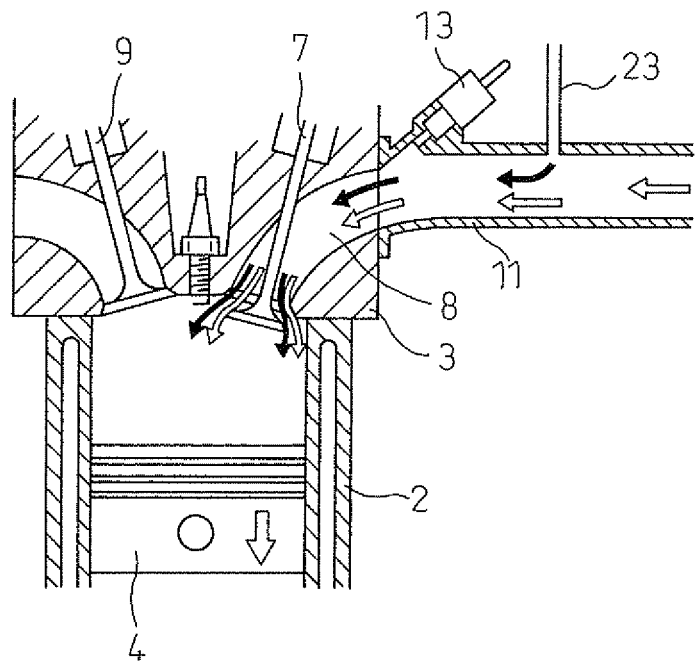
FIG. 10A and FIG. 10B are views showing a state where intake gas is blown back from the inside of a combustion chamber to the inside of an engine intake passage.

In this regard, when controlling the closing timing of the intake valve after the intake bottom dead center, if retarding the closing timing of the intake valve, part of the intake gas which was once sucked into the combustion chamber 5 will be blown back from the inside of a combustion chamber 5 to the engine intake passage. That is, as shown in FIG. 10A, if the intake valve 7 is opened during the intake stroke, that is, when the piston 4 is descending, intake gas will be sucked into the combustion chamber 5 along with the descent of the piston 4. When the EGR valve 24 is opened and EGR gas is being fed through the EGR passage 23 to the intake branch tube 11, the intake gas will contain not only air, but also EGR gas.

Figure 10B:
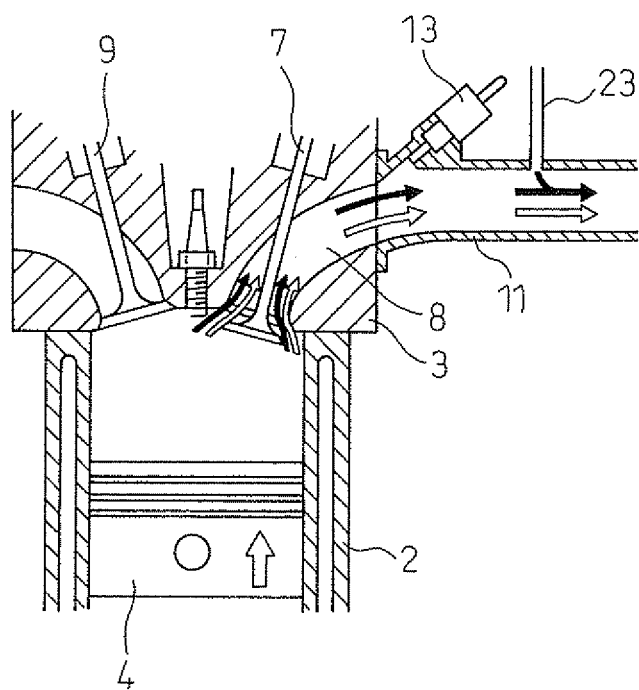

On the other hand, as shown in FIG. 10B, if the intake valve 7 is opened during the compression stroke, that is, when the piston 4 is rising, part of the intake gas which had been sucked into the combustion chamber 5 will be blown back from the inside of the combustion chamber 5 to the engine intake passage, along with the rise of the piston 4. When EGR gas is being fed through the EGR passage 23 to the intake branch tube 11, the intake gas which is blown back from the inside of the combustion chamber 5 to the engine intake passage will contain EGR gas, while the intake gas flowing back toward the surge tank 12 will be newly fed EGR gas from the EGR passage 23. Therefore, in this case, the intake gas which flows back through the inside of the engine intake passage will also contain EGR gas.

Further, the amount of blowback of the intake gas to the inside of the engine intake passage becomes greater, the longer the time the intake valve 7 is opened during the rise of the piston 4, that is, the more retarded the closing timing of the intake valve 7. Furthermore, the strength of blowback of the air-fuel mixture to the inside of the engine intake passage becomes stronger the faster the speed of rise of the piston 4 at the time the intake valve 7 is closed, that is, the more the closing timing of the intake valve 7 is relatively retarded.

In particular, when executing the superhigh expansion ratio cycle at the time of engine low load operation as explained above, the closing timing of the intake valve 7 is retarded until the limit closing timing where the closing timing of the intake valve 7 cannot be used to control the amount of intake air. For this reason, during the rise of the piston 4, the time when the intake valve 7 is open is extremely long. Therefore, the blowback of the air-fuel mixture from the inside of the combustion chamber 5 to the inside of the engine intake passage becomes extremely large and strong.

Figure 11:
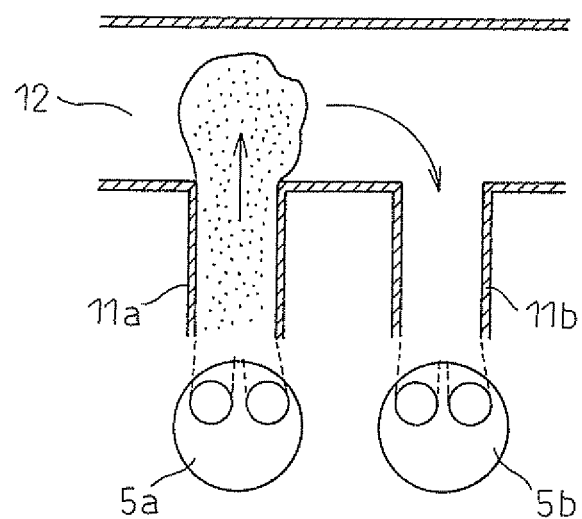
FIG. 11 is a view for explaining a relationship between blowback of intake gas and deviation among cylinders in engine air-fuel ratio.

When the blowback of the air-fuel mixture from the inside of the combustion chamber 5 to the inside of the engine intake passage is extremely large and strong in this way, if the opening degree of the EGR valve 24 is large (or if the amount of EGR gas which is fed into the intake gas is large), variations will occur among the cylinders and among the cycles in the air-fuel ratio and variations will occur among cylinders in the intake resistance to the flow of intake gas passing through the intake branch tube 11 and the inside of the intake port 8. Below, the reasons will be explained while referring to FIG. 11.

If the blowback of the intake gas from the inside of the combustion chamber 5 to the inside of the engine intake passage is large and strong, part of the intake gas will be blown back to the surge tank 12 (that is, the collective part of the intake branch tubes 11). In this case, the part of the intake gas which is blown back to the surge tank 12 will be sucked not into the original cylinder, but for example a cylinder adjoining the original cylinder or a cylinder in the middle of a intake stroke when the intake gas was blown back into the surge tank 12. If referring to the example shown in FIG. 11, part of the intake gas which is returned through an intake branch tube 11a which is communicated with a certain cylinder 5a to the surge tank 12 will not flow into the intake branch tube 11a, but will flow into an intake branch tube 11b different from the intake branch tube 11a and as a result will be sucked into a cylinder 5b (cylinder communicated with the intake branch tube 11b) different from the original cylinder 5a.

Here, if the opening degree of the EGR valve 24 is large, the intake gas which is blown back to the surge tank 12 will contain a large amount of EGR gas. For this reason, if the part of the intake gas which is blown back through the intake branch tube 11a to the surge tank 12 is sucked into a cylinder 5b which is different from the original cylinder 5a, the amount of EGR gas in the intake gas which is sucked into the cylinder 5b will increase while the amount of the EGR gas in the intake gas which is sucked into the original cylinder 5a will decrease.

If the intake gas which is blown back to the surge tank 12 moves between cylinders uniformly among all cylinders, then the amount of intake gas which moves from one cylinder to another cylinder will become identical to the amount of intake gas which moves from the other cylinder to one cylinder, so as a result the amounts of EGR gas which are finally sucked in will become uniform in all cylinders. However, in fact, depending on the shape of the surge tank 12, the flow of the intake gas inside of the surge tank 12, the order of the intake strokes, etc., there are cylinders which suck in a large amount of intake gas which is blown back from another cylinder to the surge tank 12 and cylinders which suck in a small amount. In cylinders which suck in a large amount of intake gas which is blown back from another cylinder to the surge tank 12, the amount of EGR gas in the intake gas becomes larger and therefore the air becomes smaller. On the other hand, in cylinders which suck in a small amount of intake gas which is blown back from another cylinder to the surge tank 12, the amount of EGR gas in the intake gas becomes smaller and therefore the air becomes greater. If variation occurs in the amounts of air which are sucked into the combustion chambers among cylinders in this way, as a result, variation will occur in the air-fuel ratio among cylinders.

Further, in a cylinder which sucks in a large amount of intake gas which is blown back from another cylinder to the surge tank 12, compared with other cylinders, the amount of the EGR gas which passes through the inside of the intake branch tube 11 and intake port 8 becomes greater and as a result deposits easily stick to the wall surfaces of the intake branch tube 11 and intake port 8. Conversely, in a cylinder which sucks in a small amount of intake gas which is blown back from another cylinder to the surge tank 12, compared with other cylinders, the amount of the EGR gas which passes through the inside of the intake branch tube 11 and intake port 8 becomes smaller and as a result deposits are hard to stick to the wall surfaces of the intake branch tube 11 and intake port 8. For this reason, variations occur among cylinders in the amount of deposits which stick to the wall surfaces of the intake branch tube 11 and intake port 8 and as a result variations occur among cylinders in the intake resistance to the flow of intake gas passing through the insides of the intake branch tube 11 and intake port 8.

If variations occur in the engine air-fuel ratio among cylinders and among cycles or if variations occur among cylinders in intake resistance in this way, deterioration of the combustion of the air-fuel mixture and deterioration of the fuel efficiency will be invited.

Therefore, in a first embodiment of the present invention, to suppress variations among cylinders and cycles in the engine air-fuel ratio during the introduction of the EGR gas, the amount of EGR gas is reduced when the closing timing of the intake valve is at the retarded side, compared to when it is at the advanced side.

Figure 12:
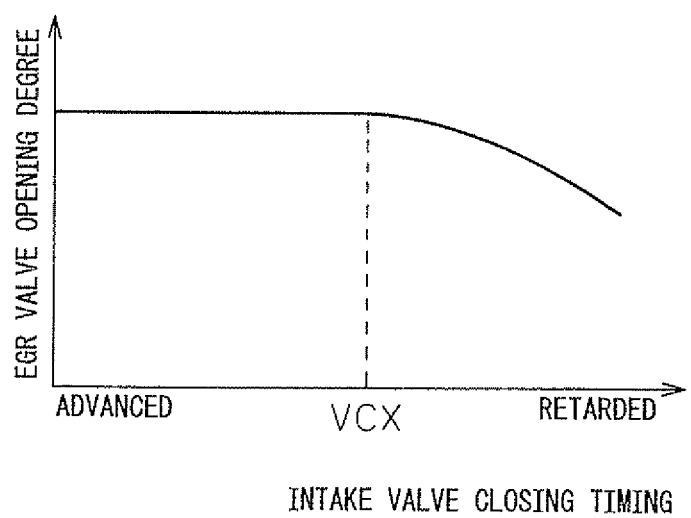
FIG. 12 is a view for explaining a relationship between a closing timing of an intake valve and a target opening degree of an EGR valve.

FIG. 12 is a view showing the relationship between the closing timing of the intake valve 7 and the opening degree of the EGR valve 24. As shown in FIG. 12, under conditions of the same engine speed and engine load, the opening degree of the EGR valve 24 is made smaller when the closing timing of the intake valve 7 is at the retarded side compared to when it is at the advanced side. In particular, as shown in FIG. 12, in the region at the retarded side from a specific closing timing VCX, as the closing timing of the intake valve 7 is retarded, the opening degree of the EGR valve 24 is made smaller. Under conditions of the same engine speed and engine load, the smaller the opening degree of the EGR valve 24, the more the amount of EGR gas is decreased, so in the present embodiment, as the closing timing of the intake valve 7 is retarded, the amount of EGR gas is decreased.

Under a situation where intake gas is being blown back to the surge tank 12, if decreasing the amount of EGR gas, the amount of EGR gas which is included in the intake gas which is blown back to the surge tank 12 is decreased. In the present embodiment, as the closing timing of the intake valve 7 is retarded, that is, as the amount of the intake gas which is blown back to the surge tank 12 is increased, the amount of EGR gas is decreased and as a result the amount of EGR gas which is included in the intake gas which is blown back to the surge tank 12 is decreased. If the amount of EGR gas which is included in the intake gas which is blown back to the surge tank 12 is decreased in this way, even if the intake gas which is blown back to the surge tank 12 moves between cylinders, the amount of the EGR gas which moves between the cylinders will become extremely small, and therefore variations which occur among cylinders in the amount of air which is sucked into the combustion chamber 5 can be suppressed and variations which occur among cylinders in the amount of deposits which stick to the wall surfaces of the intake port 8 and intake branch tube 11 can be suppressed.

Note that, the above specific closing timing VCX is controlled so that when the closing timing of the intake valve 7 is in a region at the advanced side from this specific closing timing VCX, even if intake gas is blown back from a combustion chamber 5, the intake gas will not be blown back to the surge tank 12. Further, the opening degree of the EGR valve 24 is made smaller the more the closing timing of the intake valve 7 is retarded so that the amount of EGR gas which is blown back to the surge tank 12 becomes a certain amount or less.

Figure 13A:
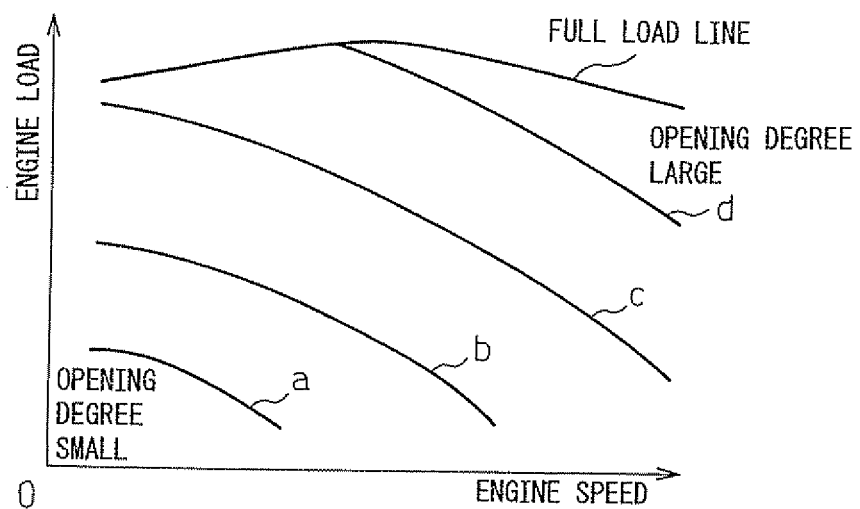
FIG. 13A and FIG. 13B are views showing various maps which are used for calculating a target opening degree of an EGR valve.
Figure 13B:
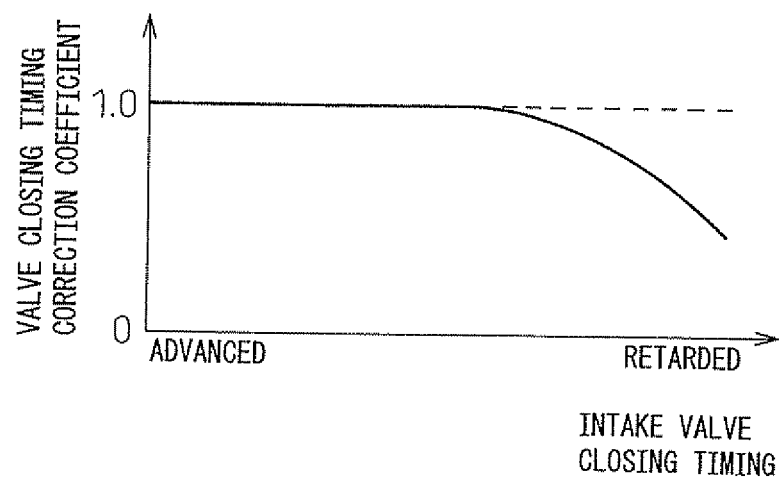

Next, referring to FIG. 13A and FIG. 13B, a concrete method for calculating the target opening degree of the EGR valve 24 will be explained. FIG. 13A and FIG. 13S are views showing the various maps which are used for calculating the target opening degree of the EGR valve 24, wherein FIG. 13A shows the relationship between the engine speed and engine load and the opening degree of the EGR valve 24 and FIG. 13B shows the relationship between the closing timing of the intake valve 7 and a closing timing correction coefficient. Further, in FIG. 13A, the lines "a" to "d" show relationships of the engine speed and engine load with the same target opening degree of the EGR valve 24. The target opening degree of the EGR valve 24 is made larger in the order of the lines "a", "b", "c", and "d".

In calculating the target opening degree of the EGR valve 24, first, the target opening degree of the EGR valve 24 is calculated based on the engine load and engine speed. Here, the target opening degree of the EGR valve 24 is in general, as shown in FIG. 13A, made larger the higher the engine load and the higher the engine speed. However, when the engine load is substantially 0 and when the engine load is substantially maximum (full load), the target opening degree of the EGR valve is made 0. In this embodiment as well, similarly, the target opening degree of the EGR valve 24 is calculated based on the engine load and engine speed by using a map such as shown in FIG. 13A.

Next, in the present embodiment, the target opening degree of the EGR valve 24 which was calculated by using the map such as shown in FIG. 13A is corrected in accordance with the closing timing of the intake valve 7. In correcting the target opening degree of the EGR valve 24, the closing timing correction coefficient is calculated based on the map shown in FIG. 13B in accordance with the closing timing of the intake valve 7. As will be understood from FIG. 13B, the closing timing correction coefficient is a coefficient which is "1" when the closing timing of the intake valve 7 is at the advanced side and which becomes smaller the more the closing timing of the intake valve 7 is retarded. The closing timing correction coefficient which is calculated in this way is multiplied with the target opening degree of the EGR valve 24 which was calculated by using the map such as shown in FIG. 13A, so that the final target opening degree of the EGR valve 24 is calculated.

Figure 14:
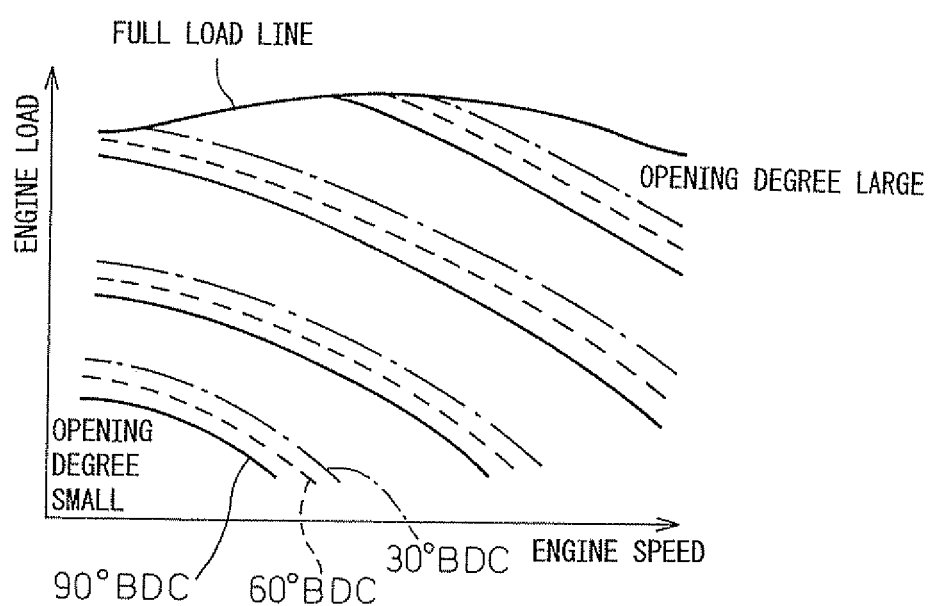
FIG. 14 is a view of a map used for calculating a target opening degree of an EGR valve.

Note that, in the above embodiment, a map shown in FIG. 13A showing the relationship between the engine load and engine speed and the opening degree of the EGR valve 24 and a map showing the relationship between the closing timing of the intake valve 7 and the closing timing correction coefficient are used to calculate the final target opening degree of the EGR valve 24. However, for example, as shown in FIG. 14, it is also possible to calculate the final target opening degree of the EGR valve, by using the map showing, for each the closing timing of the intake valve 7, the relationship between the engine load and engine speed and the target opening degree of the EGR valve 24. Note that, in FIG. 14, the solid line shows the target opening degree of the EGR valve 24 when the closing timing of the intake valve 7 is at the advanced side (for example, 90° BDC), the broken line shows the target opening degree of the EGR valve 24 when the closing timing of the intake valve 7 is a medium extent of timing (for example, 60° BDC), and the one dot-chain line shows the target opening degree of the EGR valve 24 when the closing timing of the intake valve 7 is at the retarded side (for example, 30° BDC).

Figure 15:
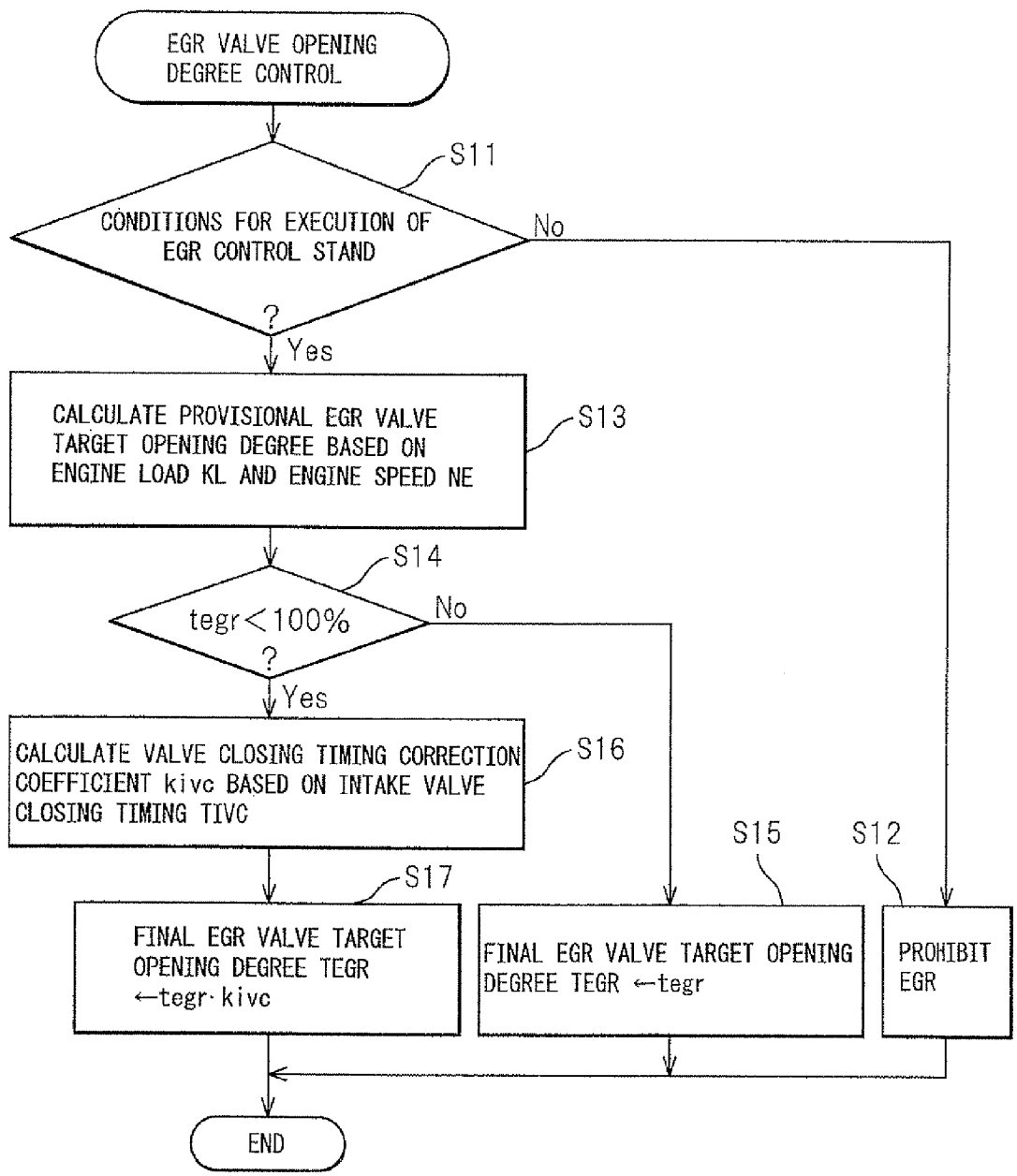
FIG. 15 is a flowchart showing a control routine of EGR valve opening degree control in a first embodiment.

FIG. 15 is a flowchart showing a control routine for EGR valve opening degree control in the present embodiment. As shown in FIG. 15, first, at step S11, it is judged if the condition for executing EGR control stands. As cases where the condition for EGR control does not stand, for example, the case right after startup of an internal combustion engine or when the amount of change of the opening degree of the throttle valve 17 is negative (at time of deceleration) may be mentioned. When it is judged at step S11 that the condition for executing EGR control does not stand, the routine proceeds to step S12 where EGR is prohibited.

On the other hand, when it is judged at step S11 that the condition for executing EGR control stands, the routine proceeds to step S13. At step S13, the provisional EGR valve target opening degree tegr is calculated based on the engine load KL and engine speed NE by using the map shown in FIG. 13A. Next, at step S14, it is judged if the provisional EGR valve target opening degree tegr is fully open. When it is judged that the provisional EGR valve target opening degree terg is fully open, the routine proceeds to step S15 where the final EGR valve target opening degree TEGR is made the same opening degree as the provisional EGR valve target opening degree terg, that is, fully open, and the opening degree of the EGR valve 24 is controlled based on the final EGR valve target opening degree TEGR. Therefore, in the map shown in FIG. 13A, in the region where the target opening degree of the EGR valve 24 is made fully open, the opening degree of the EGR valve 24 is never corrected in accordance with the closing timing of the intake valve 7.

On the other hand, when it is judged at step S14 that the provisional EGR valve target opening degree tegr is not fully open, the routine proceeds to step S16. At step S16, the closing timing correction coefficient kivc is calculated based on the closing timing of the intake valve 7 by using the map shown in FIG. 13B. Next, at step S17, the value of the provisional EGR valve target opening degree tegr which was calculated at step S13 multiplied with the closing timing correction coefficient kivc which was calculated at step S16 is made the final EGR valve target opening degree TEGR. The opening degree of the EGR valve 24 is controlled based on this final EGR valve target opening degree TEGR.

Next, a second embodiment of the present invention will be explained. The configuration of the spark ignition type internal combustion engine of the second embodiment is basically the same as the configuration of the spark ignition type internal combustion engine of the first embodiment. However, in the first embodiment, the opening degree of the EGR valve 24 was changed in accordance with only the closing timing of the intake valve 7, while in the second embodiment, the opening degree of the EGR valve 24 is changed in accordance with not only the closing timing of the intake valve 7, but also in accordance with the engine speed, engine load, and fuel properties. Below, referring to FIG. 16 and FIG. 17A to FIG. 17C, change of the opening degree of the EGR valve in accordance with the engine speed, engine load, and fuel properties will be explained.

Figure 16:
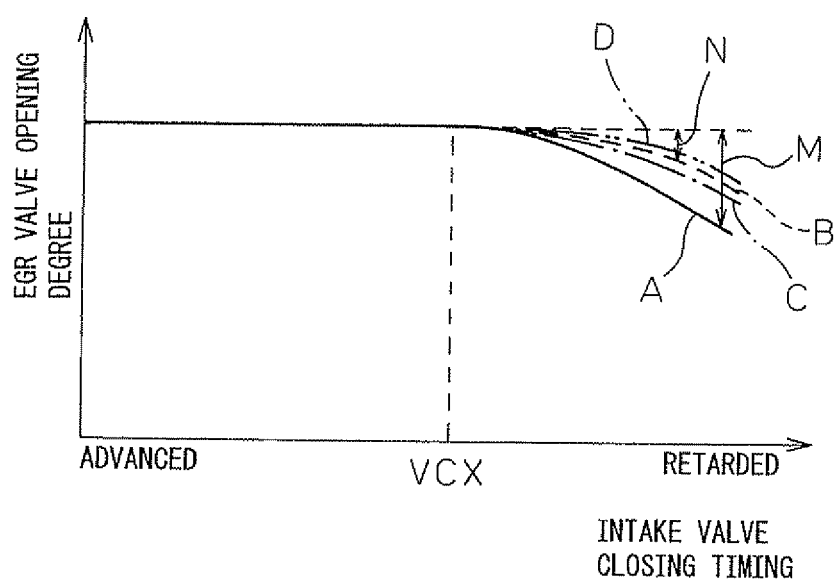
FIG. 16 is a view showing a relationship between a closing timing of an intake valve and a target opening degree of an EGR valve.

FIG. 16 is a view similar to FIG. 12. The solid line A in the figure shows the relationship between the closing timing of the intake valve and the opening degree of the EGR valve in the case where the engine speed is low and the engine load is low, the broken line B shows the relationship in the case where the engine speed is high and the engine load is low, the one-dot chain line C shows the relationship in the case where the engine speed is low and the engine load is high, and the two-dot chain line D shows the relationship in the case where the concentration of ethanol in the fuel is high.

As will be understood from FIG. 16, in the present embodiment, in the same way as the first embodiment, in particular in a region at the retarded side from a specific closing timing VCX, the more the closing timing of the intake valve 7 is retarded, the smaller the opening degree of the EGR valve 24 is made. Furthermore, in the present embodiment, when the engine speed is high (broken line B in the figure), compared with when the engine speed is low (solid line A in the figure), the extent of reducing the opening degree of the EGR valve 24 (the amount of reduction of the opening degree of the EGR valve 24) is made smaller.

Figure 17A:
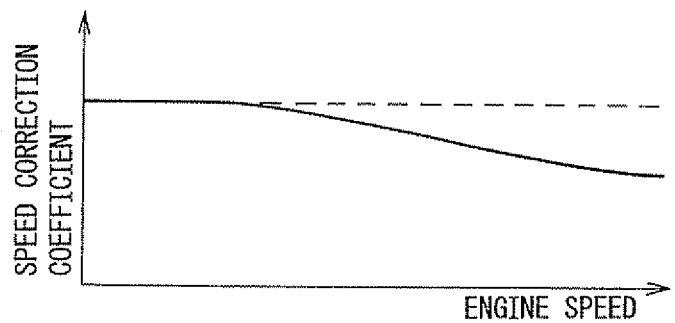
FIG. 17A to FIG. 17C are views showing a relationship between an engine speed, engine load, and ethanol concentration and a correction coefficient of a closing timing of an intake valve.

That is, as shown in FIG. 16, in a region at the retarded side from a specific closing timing VCX, the more the closing timing of the intake valve 7 is retarded, the greater the amount of reduction M of the opening degree of the EGR valve 24, but in the present embodiment, the amount of reduction M of the opening degree of the EGR valve 24 is made smaller the higher the engine speed. Specifically, the amount of reduction M of the opening degree of the EGR valve 24 which was calculated based on the closing timing of the intake valve 7 is multiplied with a speed correction coefficient such as shown in FIG. 17A, whereby the amount of decrease N of the final opening degree of the EGR valve 24 is calculated and, therefore, the final target opening degree of the EGR valve is calculated.

Here, the intake port 8, intake valve 7, piston 4, etc. have shapes facilitating the flow of the intake gas from the engine intake passage to the inside of a combustion chamber 5. Conversely speaking, these do not have shapes facilitating the flow of the intake gas from the combustion chamber 5 to the inside of the engine intake passage. For this reason, the flow resistance when the intake gas flows out from the combustion chamber 5 to the inside of the engine intake passage is larger than the flow resistance when the intake gas flows in from the engine intake passage to the inside of the combustion chamber 5. The difference between the flow resistance at the time of this inflow of intake gas and the flow resistance at the time of outflow of the intake gas is larger the higher the flow rate of the intake gas, that is, the higher the engine speed. Therefore, the higher the engine speed, the harder it is for the intake gas inside of the combustion chamber 5 to flow out into the engine intake passage and the harder it is for the intake gas which was once sucked into the combustion chamber 5 to be blown back from the inside of the combustion chamber 5 to the engine intake passage. In other words, the higher the engine speed, the smaller the effect of retarding the closing timing of the intake valve 7 on the blowback of intake gas.

In the present embodiment, as the engine speed becomes higher, the amount of reduction of the opening degree of the EGR valve 24 is made smaller, that is, the opening degree of the EGR valve 24 is made larger. In the above-mentioned way, the higher the engine speed, the harder it is for blowback of intake gas to occur, so even if the opening degree of the EGR valve 24 is made larger and the amount of EGR gas which is fed into the engine intake passage is increased, the variation in the amount of EGR gas among the cylinders is suppressed. Further, the opening degree of the EGR valve 24 is made larger, so the amount of EGR gas which is fed into a combustion chamber 5 can be increased.

Figure 17B:
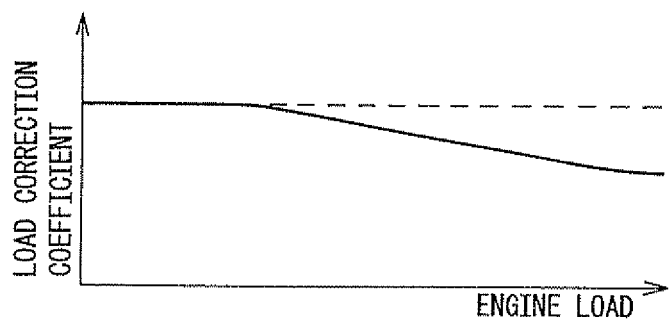

Further, in the present embodiment, the extent by which the opening degree of the EGR valve 24 is reduced is made smaller when the engine load is high (one-dot chain line C in the figure) compared with when the engine load is low (solid line A in the figure). That is, in the present embodiment, the amount of reduction M of the opening degree of the EGR valve 24 is made smaller the higher the engine load becomes. Specifically, the amount of reduction of the opening degree of the EGR valve 24 which is calculated based on the closing timing of the intake valve 7 is multiplied with the load correction coefficient such as shown in FIG. 17B, whereby the amount of reduction of the final opening degree of the EGR valve 24 is calculated and, therefore, the final target opening degree of the EGR valve is calculated.

Here, in general, the lower the engine load, the more the combustion temperature falls. Further, the lower the engine load, the higher the residual gas ratio in a combustion chamber 5. That is, so long as the mechanical compression ratio is constant, the volume of the combustion chamber at exhaust top dead center will not change in accordance with the engine load, and therefore the amount of unburned residual gas in the combustion chamber 5 will become substantially constant regardless of the engine load. On the other hand, if the engine load becomes lower, the amount of intake gas which is fed into the combustion chamber 5 will become smaller. For this reason, the ratio of the residual gas in the intake gas in the combustion chamber 5 at the time of closing of the intake valve 7 becomes higher the lower the engine load. In this way, the lower the engine load, the more the combustion temperature falls and the more the residual gas ratio rises, whereby the lower the engine load, the harder it becomes for the air-fuel mixture in the combustion chamber 5 to burn and the easier it becomes for misfire to occur. Therefore, the lower the engine load, the greater the susceptibility to the effects of variations among cylinders and among cycles in the engine air-fuel ratio occurring due to the blowback of intake gas.

In the present embodiment, as the engine load becomes higher, the amount of reduction of the opening degree of the EGR valve 24 is made smaller, that is, the opening degree of the EGR valve 24 is made greater. In the above-mentioned way, the higher the engine load, the more the combustion temperature rises and the lower the residual gas ratio in the combustion chamber 5 becomes, so even if increasing the opening degree of the EGR valve 24 to increase the amount of EGR gas which is fed into the engine intake passage, it is possible to stably burn the air-fuel mixture.

Figure 17C:
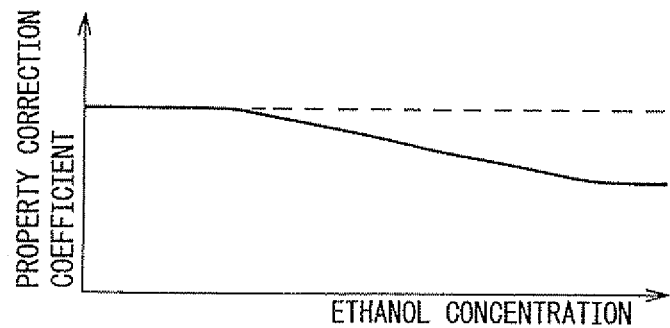

Furthermore, in the present embodiment, when the concentration of ethanol in the fuel which is fed into the combustion chamber 5 is high (two-dot chain line "D" in the figure), compared to when the concentration of ethanol is low (solid line A in the figure), the extent of reduction of the opening degree of the EGR valve 24 is made smaller. That is, in the present embodiment, the amount of reduction M of the opening degree of the EGR valve 24 is made smaller the higher the concentration of ethanol in the fuel. Specifically, the amount of reduction M of the opening degree of the EGR valve 24, which is calculated based on the closing timing of the intake valve 7, is multiplied with a property correction coefficient such as shown in FIG. 17C, whereby the amount of reduction of the final opening degree of the EGR valve 24 is calculated and, therefore, the final target opening degree of the EGR valve is calculated.

Here, when using ethanol as fuel, after the internal combustion engine is warmed up, combustion is easier than with gasoline. Therefore, the higher the concentration of ethanol in the fuel, the easier combustion of the air-fuel mixture which is fed into the combustion chamber 5 becomes. Therefore, the higher the concentration of ethanol in the fuel, the greater the resistance to the effects of variations among cylinders and among cycles in the engine air-fuel ratio occurring due to the blowback of intake gas.

In the present embodiment, as the concentration of ethanol in the fuel becomes higher, the amount of reduction of the opening degree of the EGR valve 24 is made smaller, that is, the opening degree of the EGR valve is made larger. In the above-mentioned way, the higher the concentration of ethanol in the fuel, the easier it becomes for the air-fuel mixture to burn, so even if increasing the opening degree of the EGR valve 24 and the amount of EGR gas which is fed into the engine intake passage is increased, it is possible to stably make the air-fuel mixture burn.

Figure 18:
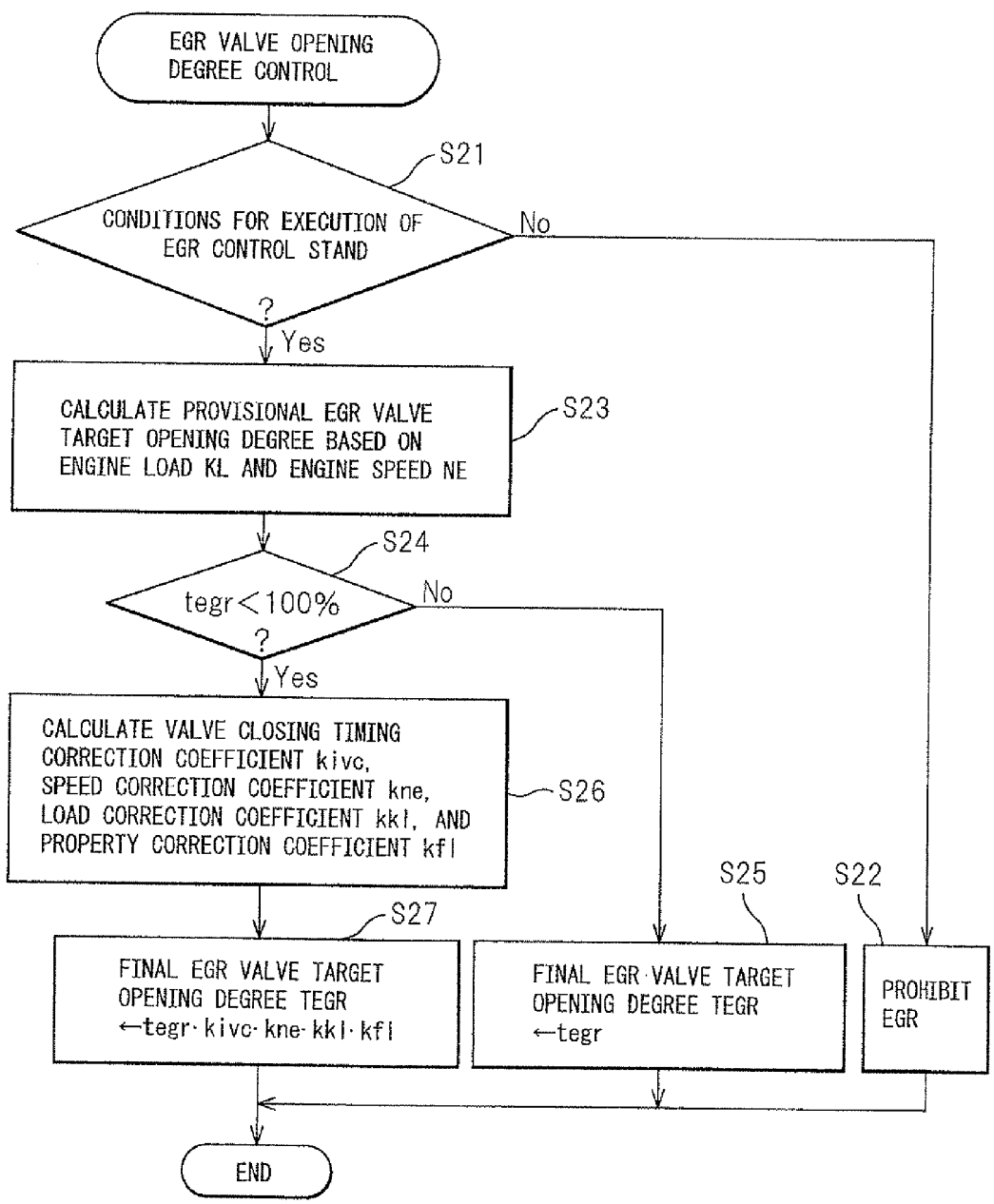
FIG. 18 is a flowchart showing a control routine of EGR valve opening degree control in a second embodiment.

FIG. 18 is a flowchart showing a control routine of EGR valve opening degree control in a second embodiment. Steps S21 to S25 in FIG. 18 are similar to steps S11 to S15 in FIG. 15, so explanations will be omitted.

When it is judged at step S24 that a provisional EGR valve target opening degree tegr is not fully open, the routine proceeds to step S26. At step S26, a closing timing correction coefficient kivc is calculated based on the closing timing of the intake valve 24 and by using the map shown in FIG. 13B. Further, a speed correction coefficient kne is calculated based on the engine speed and by using the map shown in FIG. 17A. Further, a load correction coefficient kkl is calculated based on the engine load and by using the map shown in FIG. 17B. Furthermore, a property correction coefficient kfl is calculated based on the concentration of ethanol in the fuel and by using the map shown in FIG. 17C.

Next, at step S27, the value of the provisional EGR valve target opening degree tegr which was calculated at step S23 multiplied with the closing timing correction coefficient kivc, speed correction coefficient kne, load correction coefficient kkl, and property correction coefficient kfl which were calculated at step S26 is made the final EGR valve target opening degree TEGR. Based on the final EGR valve target opening degree TEGR, the opening degree of the EGR valve 24 is controlled.

Next, a third embodiment of the present invention will be explained. The configuration of the spark ignition type internal combustion engine of the third embodiment is basically the same as the configuration of the spark ignition type internal combustion engine of the second embodiment. However, in the second embodiment, the opening degree of the EGR valve 24 was changed without regard as to the temperature of the engine coolant, while in the third embodiment, the opening degree of the EGR valve 24 is changed while considering the temperature of the engine coolant. Below, the change of the opening degree of the EGR valve while considering the temperature of the engine coolant will be explained while referring to FIG. 19A and FIG. 19B.

In this regard, the lower the temperature of the engine coolant, that is, the lower the temperature of the internal combustion engine, the more the combustion of the air-fuel mixture in a combustion chamber 5 deteriorates. On the other hand, the lower the EGR rate (concentration of EGR gas in intake gas), the stabler the combustion of the air-fuel mixture in the combustion chamber 5. For this reason, in general, to maintain a good combustion of the air-fuel mixture in the combustion chamber 5, the lower the temperature of the engine coolant, the smaller the opening degree of the EGR valve 24 is made.

Further, as explained above, due to the blowback of intake gas containing EGR gas, variations occur among the cylinders in the engine air-fuel ratio and deterioration of combustion of the air-fuel mixture is invited. Therefore, in the above first embodiment and second embodiment, the opening degree of the EGR valve 24 is set in accordance with the closing timing of the intake valve 7 etc. to suppress deterioration of the combustion of the air-fuel mixture.

Here, the deterioration of combustion of the air-fuel mixture accompanying the blowback of intake gas containing EGR gas is insusceptible to the effects of the temperature of the engine coolant. Conversely, the deterioration of combustion of the air-fuel mixture accompanying the fall of the temperature of the engine coolant is insusceptible to the effects of the amount of intake gas which is blown back.

Therefore, in the present embodiment, in the same way as the above first embodiment or second embodiment, the target opening degree of the EGR valve 24 is calculated based on the closing timing of the intake valve 7, engine speed, engine load, and fuel properties. Aside from this, the target opening degree of the EGR valve 24 is calculated based on the temperature of the engine coolant, and the opening degree of the EGR valve 24 is controlled to the smaller target opening degree among these calculated target opening degrees of the EGR valve 24.

Figure 19A:
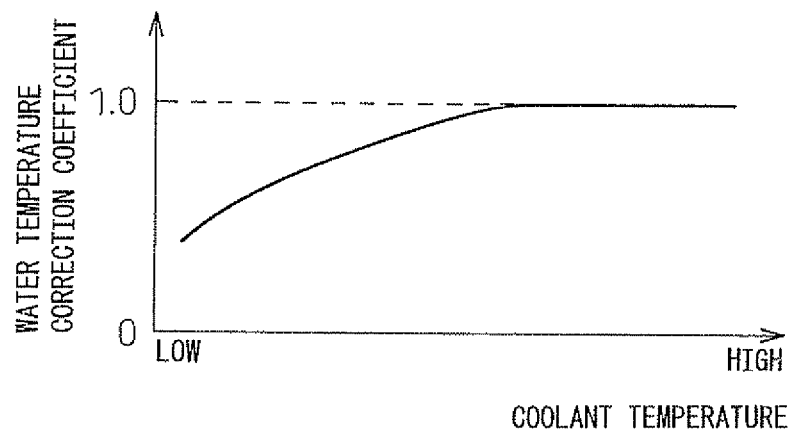
FIG. 19A and FIG. 19B are views showing maps used for calculating the target opening degree of the EGR valve based on the temperature of the engine coolant.

Next, referring to FIG. 19A, a concrete method of calculation of the target opening degree of the EGR valve 24 based on the temperature of the engine coolant will be explained. FIG. 19A shows the relationship between the temperature of the engine coolant and the water temperature correction coefficient.

In calculating the target opening degree of the EGR valve 24 based on the temperature of the engine coolant, first, the target opening degree of the EGR valve 24 is calculated based on the engine load and engine speed by using the map such as shown in FIG. 13A. Next, in the present embodiment, the target opening degree of the EGR valve 24 which is calculated in this way is corrected in accordance with the temperature of the engine coolant. In correcting the opening degree of the EGR valve 24, the water temperature correction coefficient is calculated in accordance with the temperature of the engine coolant, based on the map shown in FIG. 19A. As will be understood from FIG. 19A, the water temperature correction coefficient is a coefficient which is "1" when the temperature of the engine coolant is high and which becomes smaller as the temperature of the engine coolant becomes lower. By multiplying the water temperature correction coefficient which is calculated in this way with the target opening degree of the EGR valve 24 which was calculated by using the map such as shown in FIG. 13A, the target opening degree of the EGR valve 24 based on the temperature of the engine coolant is calculated.

Figure 19B:
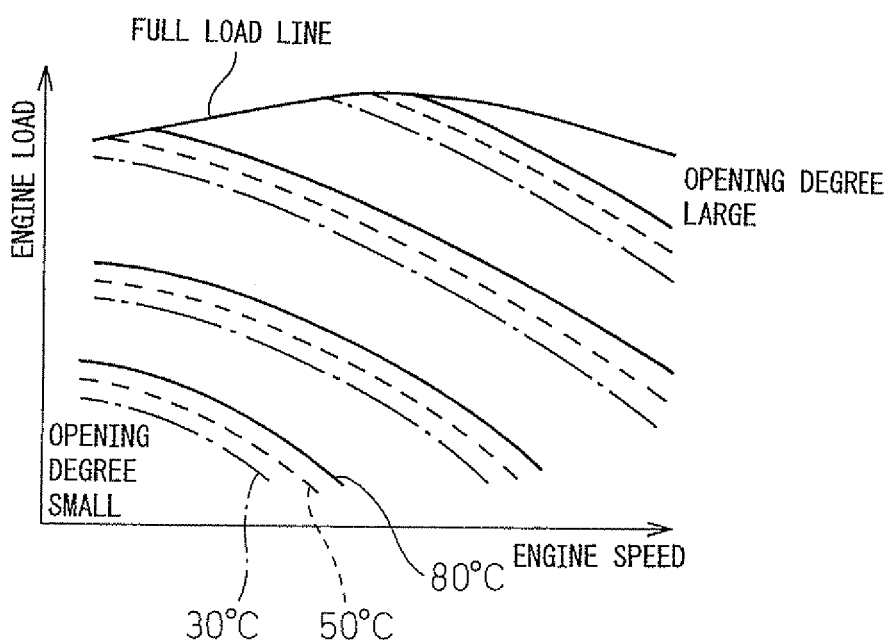

Note that, in the above embodiment, the map shown in FIG. 13A and the map shown in FIG. 19A are used to calculate the target opening degree of the EGR valve 24 based on the temperature of the engine coolant. However, for example, as shown in FIG. 19B, it is also possible to use a map showing the relationship between the engine load and engine speed and the opening degree of the EGR valve 24 for each temperature of the engine coolant so as to calculate the target opening degree of the EGR valve 24 based on the temperature of the engine coolant. Note that, in FIG. 19B, the solid line shows the target opening degree of the EGR valve 24 when the temperature of the engine coolant is high (for example, 80° C. or more), the broken line shows the target opening degree when the temperature of the engine coolant is of a medium extent (for example, 50° C.), and the one-dot chain line shows the target opening degree when the temperature of the engine coolant is low (for example, 30° C.).

In the present embodiment, the target opening degree of the EGR valve 24 based on the temperature of the engine coolant which is calculated in this way and the target opening degree of the EGR valve 24 which was calculated as shown in the above first embodiment or second embodiment are compared, and the opening degree of the EGR valve 24 is controlled to the smaller of these target opening degrees of the EGR valve 24.

As a result, it is possible to maintain the EGR rate as high as possible while suppressing deterioration of combustion of the air-fuel mixture from the viewpoint of blowback of intake gas and the viewpoint of the temperature of the engine coolant.

Figure 20:
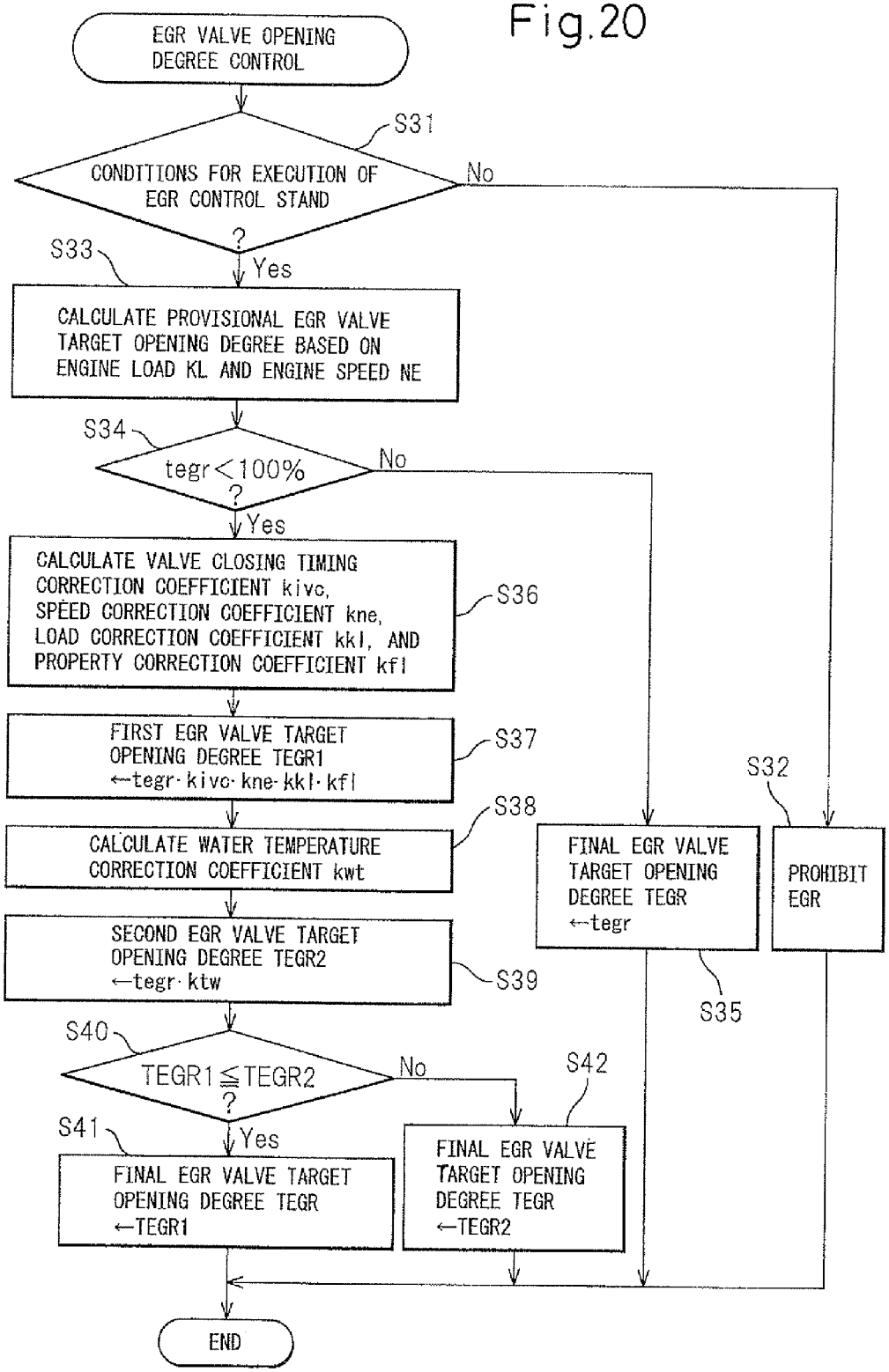
FIG. 20 is a flowchart showing a control routine of EGR valve opening degree control in a third embodiment.

FIG. 20 is a flowchart showing a control routine of EGR valve opening degree control in a third embodiment. Steps S31 to S36 of FIG. 20 are similar to steps S21 to S26 of FIG. 18, so explanations will be omitted.

At step S37, the value of the provisional EGR valve target opening degree tegr which was calculated at step S33 multiplied by the valve opening correction coefficient kive, speed correction coefficient kne, load correction coefficient kkl, and property correction coefficient kfl which were calculated at step S36 is made the first EGR valve target opening degree TEGR1.

Next, at step S38, the water temperature correction coefficient kwt is calculated based on the temperature of the engine coolant by using the map shown in FIG. 19A. Next, at step S39, the value of the provisional EGR valve opening degree tegr which was calculated at step S33 multiplied with the water temperature correction coefficient kwt which was calculated at step S38 is made the second EGR valve target opening degree TEGR2.

At step S40, it is judged if the first EGR valve target opening degree TEGR1 which was calculated at step S37 is the second EGR valve target opening degree TEGR2 or less. When it is judged that TEGR1 is TEGR2 or less, the routine proceeds to step S41 where the first EGR valve target opening degree TEGR1 is made the final EGR valve target opening degree TEGR. On the other hand, when it is judged that TEGR2 is larger than TEGR1, the routine proceeds to step S42 where the second EGR valve target opening degree TEGR2 is made the final EGR valve target opening degree. That is, at steps S40 to S42, the final EGR valve target opening degree is made the smaller value of the first EGR valve target opening degree TEGR1 and the second EGR valve target opening degree TEGR2. After that, the opening degree of the EGR valve 24 is controlled so as to give the final EGR valve target opening degree TEGR.

Note that, in the above third embodiment, the target opening degree of the EGR valve 24 based on the temperature of the engine coolant and the target opening degree of the EGR valve 24 which is calculated as shown in the above first embodiment or second embodiment are separately calculated. However, for example, it is also possible to correct the target opening degree of the EGR valve 24, which was calculated based on the closing timing of the intake valve 7 etc., based on the temperature of the engine coolant.

Next, a fourth embodiment of the present invention will be explained. The configuration of the spark ignition type internal combustion engine of the fourth embodiment is basically the same as the configurations of the spark ignition type internal combustion engines of the first embodiment to third embodiment. However, in the first embodiment to the third embodiment, the opening degree of the EGR valve 24 is controlled in accordance with the closing timing of the intake valve 7, while in the fourth embodiment, the closing timing of the intake valve 7 is controlled in accordance with the opening degree of the EGR valve 24 (or EGR rate).

In this regard, the optimum value of the opening degree of the EGR valve 24 is determined in accordance with the engine speed and engine load as shown in FIG. 13A from the viewpoint of the reduction of the HC, CO, and $NO_X$ in the exhaust gas which is exhausted from the combustion chamber 5 and from the viewpoint of improvement of the fuel efficiency. That is, the optimum value of the amount of EGR gas to be fed is determined in accordance with the engine speed and engine load. However, as mentioned above, if feeding a large amount of EGR gas in the state where blowback of intake gas is large, deterioration of the combustion state will be invited. Therefore, in the above first embodiment to third embodiment, when the closing timing of the intake valve is at the retarded side, the opening degree of the EGR valve 24 is made smaller, that is, the amount of EGR gas which is fed is reduced, so as to suppress deterioration of the combustion state.

On the other hand, the above-mentioned such deterioration of the combustion state can be controlled, without reducing the amount of EGR gas fed, by reducing the amount of blowback of the intake gas. Therefore, in the present embodiment, when the amount of EGR gas to be fed is large, in order to suppress deterioration of the combustion accompanying the blowback of intake gas, the retardation guard timing of the closing of the intake valve is changed to a timing at the advanced side.

Figure 21:
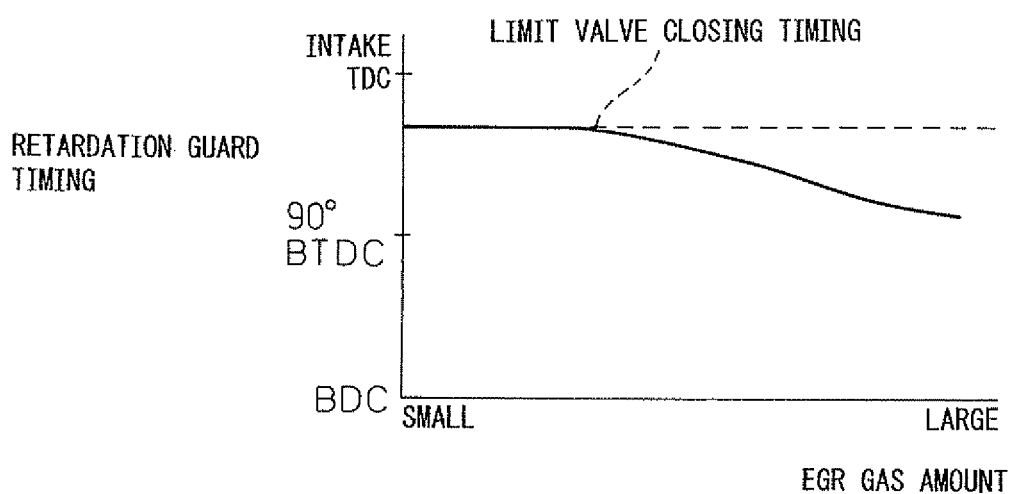
FIG. 21 is a view showing a relationship between an amount of EGR gas which is fed into intake gas and a retardation guard timing of closing of an intake valve.

FIG. 21 is a view showing the relationship between the amount of EGR gas which is fed into intake gas in the present embodiment and the retardation guard timing of closing of the intake valve. Here, the "retardation guard timing" is the retarded side limit value of the closing timing of the intake valve 7. Accordingly, the range in which the closing timing of the intake valve 7 can be changed is restricted to the advanced side from the retardation guard timing. In the region with a small amount of EGR gas, the retardation guard timing is made the limit closing timing.

As will be understood from FIG. 21, in the present embodiment, the larger the amount of EGR gas, the more to the advanced side the retardation guard timing of closing of the intake valve is set. In more detail, the retardation guard timing of the closing of the intake valve is advanced as the amount of EGR gas increases so that the amount of EGR gas which is blown back into the surge tank 12 is maintained at a certain amount or less.

By setting the retardation guard timing of the closing of the intake valve in this way, in the engine low load operation region where the closing timing of the intake valve 7 is made the limit closing timing when the closing timing of the intake valve is not guarded, the closing timing of the intake valve 7 is advanced when the amount of EGR gas is large compared with when it is small.

FIG. 22 shows the changes in the closing timing of the intake valve 7, mechanical compression ratio, and actual compression ratio in accordance with the engine load in the region where the engine load is relatively low. In FIG. 22, the solid line A shows the changes in the case where the amount of EGR gas is large, the broken line B shows the changes in the case where the amount of EGR gas is small, and the one-dot chain line C shows the changes in the case where the amount of EGR gas is zero.

As shown in FIG. 22, when the amount of EGR gas is large, the retardation guard timing of the closing of the intake valve is set to the advanced side. For this reason, the closing timing of the intake valve 7 is not made a timing at the retarded side from the retardation guard timing. As a result, as shown in FIG. 13 by the solid line A, it is set to a timing at the advanced side from the case where the amount of EGR gas is zero (one-dot chain line C in FIG. 13).

In this way, in the engine low load operation region, if the closing timing of the intake valve 7 is set to a timing at the advanced side from the case where the amount of EGR gas is zero, the mechanical compression ratio is made smaller in accordance with the amount of advance. As a result, the actual compression ratio is made substantially the same as the case where the amount of EGR gas is zero. Conversely speaking, the mechanical compression ratio is made smaller in accordance with the amount of advance of the closing timing of the intake valve 7 so that even when the amount of EGR gas is large, the actual compression ratio becomes the same as the case where the amount of EGR gas is zero.

Further, if the amount of EGR gas becomes smaller, as shown in FIG. 21, the retardation guard timing of the closing of the intake valve is changed to the retarded side. For this reason, when the amount of EGR gas is small, the closing timing of the intake valve 7, as shown in FIG. 22 by the broken line B, is made a timing at the retarded side from the case where the amount of EGR gas is large (solid line A in the figure).

Note that, in the present embodiment, the opening degree of the throttle valve 17 is controlled in the same way as when the amount of EGR gas is zero.

In this way, in the present embodiment, when the amount of EGR gas is large, the closing timing of the intake valve 7 is advanced, therefore the amount of blowback of the intake gas is reduced. Therefore, it is possible to suppress deterioration of combustion accompanying blowback of intake gas.

Note that, as explained above, the higher the engine load, the more the residual gas ratio is reduced, so combustion becomes harder to deteriorate. Further, the higher the engine speed, the larger the flow resistance to the blowback of intake gas and the harder it is for the intake gas to be blown back.

Furthermore, the higher the concentration of ethanol in the fuel, the easier it is for the air-fuel mixture to burn. For this reason, in the present embodiment, it is also possible to make it so that the higher the engine load, the higher the engine speed, and the higher the concentration of ethanol in the fuel, the more the amount of advance of the guard timing of closing of the intake valve is reduced.

By setting the retardation guard timing of the closing of the intake valve in this way, in the engine low load operation region where the closing timing of the intake valve 7 is made the limit closing timing when the closing timing of the intake valve 7 is not guarded, the closing timing of the intake valve 7 is advanced when the engine speed is low compared with when it is high. Similarly, in the engine low load operation region, the closing timing of the intake valve 7 is advanced when the engine load is low compared with when it is high. Furthermore, in the engine low load operation region, the closing timing of the intake valve 7 is advanced when the concentration of ethanol in the fuel is low compared to when it is high.

FIG. 23 is a flowchart showing the control routine of operational control in the present embodiment. As shown in FIG. 23, first, at step S51, the target mechanical compression ratio tem and the target closing timing tivc of the intake valve 7 are calculated based on the engine load KL and engine speed NE by using the map such as shown in FIG. 9. Next, at step S52, it is judged if the condition for executing the EGR control stands. When it is judged that the condition for executing the EGR control does not stand, the routine proceeds to step S53 where EGR is prohibited. Next, at step S59, the variable compression ratio mechanism A is controlled so that the mechanical compression ratio becomes the mechanical compression ratio cm which was calculated at step S51, and the variable valve timing mechanism B is controlled so that the closing timing of the intake valve 7 becomes the target intake valve closing timing tivc which was calculated at step S51.

On the other hand, when, at step S52, it is judged that the condition for executing the EGR control stands, the routine proceeds to step S54. At step S54, the EGR valve opening degree tegr is calculated based on the engine load KL and engine speed NE by using the map such as shown in FIG. 13A. Next, at step S55, the retardation guard timing of the closing of the intake valve givc is calculated based on the EGR valve opening degree tegr which was calculated at step S54 by using a map such as shown in FIG. 21. At step S56, it is judged if the target closing timing tivc of the intake valve 7 which was calculated at step S51 is at the retarded side from the retardation guard timing of the closing of the intake valve givc which was calculated at step S55.

When it is judged at step S56 that the target closing timing tivc of the intake valve 7 is the same timing or is at the advanced side from the retardation guard timing of the closing of the intake valve givc, steps S57 and S58 are skipped. On the other hand, when it is judged at step S56 that the target closing timing tivc of the intake valve 7 is at the retarded side from the retardation guard timing of the closing of the intake valve givc, the routine proceeds to step S57. At step S57, the target closing timing tivc is made the retardation guard timing of the closing of the intake valve givc, then the routine proceeds to step S58. At step S58, based on the target closing timing tivc which was calculated at step S57, the target mechanical compression ratio tam is corrected so that the actual compression ratio does not change. Next, at step S59, the variable valve timing mechanism B and variable compression ratio mechanism A are controlled so as to give the target closing timing of the intake valve 7 which was calculated at step S51 or step S57 and so as to give the target mechanical compression ratio which was calculated at step S51 or step S58.

Note that, in calculating the closing timing of the intake valve 7, like in the above embodiments, it is also possible to use the opening degree of the EGR valve 24 etc. as the basis to calculate the target closing timing of the intake valve 7 and, separately from this, use the temperature of the engine coolant as the basis to calculate the target closing timing of the intake valve 7, and then control the closing timing of the intake valve 7 to give the target closing timing at the advanced side among these target closing timings.

Alternatively, it is also possible to reduce the amount of advance of the guard timing of closing of the intake valve, the higher the temperature of the engine coolant. By setting the retardation guard timing of closing of the intake valve in this way, in the engine low load operation region where the closing timing of the intake valve 7 is made the limit closing timing when the closing timing of the intake valve 7 is not guarded, the closing timing of the intake valve 7 is advanced when the temperature of the engine coolant is low compared to when it is high.

Next, a fifth embodiment of the present invention will be explained. The configuration of the spark ignition type internal combustion engine of the fifth embodiment is basically similar to the configuration of the spark ignition type internal combustion engine of the fourth embodiment. However, in the fourth embodiment, the opening degree of the EGR valve 24 is controlled regardless of the opening degree of the throttle valve 17, while in the present embodiment, the opening degree of the EGR valve 24 is controlled in accordance with the opening degree of the throttle valve 17.

In this regard, in the embodiment shown in FIG. 9, at the time of the low load side of engine medium load operation where the engine load is lower than $L_1$ and at the time of engine low load operation, the actual compression ratio is made to fall compared with the actual compression ratio at the time of engine high load operation. If the actual compression ratio falls in this way, the temperature inside of a combustion chamber 5 at the compression end will fall and the ignition and burning of fuel will become difficult. In this regard, in this case, if the opening degree of the throttle valve 17 is made smaller, due to the throttling action by the throttle valve 17 on the amount of intake air, disturbance occurs inside the combustion chamber 5 and therefore the ignition and combustion of the fuel can be improved.

However, in this case, if making the opening degree of the throttle valve 17 smaller, an increase in pumping loss will be invited and a decrease in the amount of air which is fed into a combustion chamber 5 will be invited. Therefore, in the present embodiment, when making the opening degree of the throttle valve 17 small, the opening degree of the EGR valve 24 is made larger and the amount of EGR gas is increased and also the closing timing of the intake valve 7 is corrected to the advanced side.

That is, by making the opening degree of the EGR valve 24 larger, it is possible to keep the pressure inside of the engine intake passage at the downstream side of the throttle valve 17 from becoming a negative pressure. Therefore, by making the opening degree of the throttle valve 17 smaller and along with this making the opening degree of the EGR valve 24 larger, it is possible to compensate for the increase in the pumping loss.

Therefore, in the above embodiment, the opening degree of the EGR valve 24 is set irregardless of the opening degree of the throttle valve 17 based on the engine load and engine speed, while in the present embodiment, the opening degree of the EGR valve 24 is set based on not only the engine load and engine speed, but also the opening degree of the throttle valve 17. Further, in the present embodiment, the opening degree of the EGR valve 24 which was set in this way is used as the basis, as shown in FIG. 21, to set the retardation guard timing for closing of the intake valve.

Note that, the present invention was explained in detail based on specific embodiments, but a person skilled in the art could make various changes, modifications, etc. without departing from the claims and concept of the present invention.

EXPLANATION OF REFERENCES

1 . . . crankcase
2 . . . cylinder block
3 . . . cylinder head
4 . . . piston
5 . . . combustion chamber
7 . . . intake valve
70 . . . intake valve drive use cam shaft
A . . . variable compression ratio mechanism
B . . . variable valve timing mechanism

The invention claimed is:

1. A spark ignition type internal combustion engine comprising:
   a variable closing timing mechanism able to change a closing timing of an intake valve after intake bottom dead center;
   an EGR mechanism making a part of exhaust gas flow again into a combustion chamber as EGR gas; and
   a controller for controlling the variable closing timing mechanism and the EGR mechanism,
   wherein the controller controls the variable closing timing mechanism and the EGR mechanism so that the further the closing timing of the intake valve is to the retarded side, the more the amount of EGR gas is reduced, only in the region where the closing timing of the intake valve is at the retarded side from a specific closing timing, and
   wherein the extent by which the amount of EGR gas is decreased is made smaller when the engine load is high compared to when low.

2. A spark ignition type internal combustion engine comprising:
   a variable closing timing mechanism able to change a closing timing of an intake valve after intake bottom dead center;
   an EGR mechanism making a part of exhaust gas flow again into a combustion chamber as EGR gas; and
   a controller for controlling the variable closing timing mechanism and the EGR mechanism,
   wherein the controller controls the variable closing timing mechanism and the EGR mechanism so that the further the closing timing of the intake valve is to the retarded side, the more the amount of EGR gas is reduced, only in the region where the closing timing of the intake valve is at the retarded side from a specific closing timing, and
   wherein the extent by which the amount of EGR gas is decreased is made smaller when the engine speed is high compared to when low.

3. A spark ignition type internal combustion engine comprising:
   a variable closing timing mechanism able to change a closing timing of an intake valve after intake bottom dead center;
   an EGR mechanism making a part of exhaust gas flow again into a combustion chamber as EGR gas; and a controller for controlling the variable closing timing mechanism and the EGR mechanism, wherein the controller controls the variable closing timing mechanism and the EGR mechanism so that the further the closing timing of the intake valve is to the retarded side, the more the amount of EGR gas is reduced, only in the region where the closing timing of the intake valve is at the retarded side from a specific closing timing, and wherein the extent by which the amount of EGR gas is decreased is made smaller when the temperature of the engine coolant is high compared to when low.

4. A spark ignition type internal combustion engine comprising:

a variable closing timing mechanism able to change a closing timing of an intake valve after intake bottom dead center;

an EGR mechanism making a part of exhaust gas flow again into a combustion chamber as EGR gas; and a controller for controlling the variable closing timing mechanism and the EGR mechanism, wherein the controller controls the variable closing timing mechanism and the EGR mechanism so that the further the closing timing of the intake valve is to the retarded side, the more the amount of EGR gas is reduced, only in the region where the closing timing of the intake valve is at the retarded side from a specific closing timing, and wherein the extent by which the amount of EGR gas is decreased is made smaller when a concentration of ethanol in fuel is high compared to when low.

5. A spark ignition type internal combustion engine comprising:

a variable closing timing mechanism able to change a closing timing of an intake valve after intake bottom dead center;

an EGR mechanism making a part of exhaust gas flow again into a combustion chamber as EGR gas; and a controller for controlling the variable closing timing mechanism and the EGR mechanism, wherein the controller controls the variable closing timing mechanism and the EGR mechanism so that the further the closing timing of the intake valve is to the retarded side, the more the amount of EGR gas is reduced, only in the region where the closing timing of the intake valve is at the retarded side from a specific closing timing, wherein the amount of EGR gas to be fed into a combustion chamber is calculated based on not only the closing timing of the intake valve, but also the temperature of the engine coolant, and wherein the above EGR mechanism is controlled to give the smaller of the amount of EGR gas between the amount of EGR gas which is calculated based on the closing timing of the intake valve and the amount of EGR gas which is calculated based on the temperature of the engine coolant.

6. A spark ignition type internal combustion engine comprising:

a variable closing timing mechanism able to change a closing timing of an intake valve after intake bottom dead center;

an EGR mechanism making a part of exhaust gas flow again into a combustion chamber as EGR gas; and a controller for controlling the variable closing timing mechanism and the EGR mechanism, wherein the controller controls the variable closing timing mechanism and the EGR mechanism so that the further the closing timing of the intake valve is to the retarded side, the more the amount of EGR gas is reduced, only in the region where the closing timing of the intake valve is at the retarded side from a specific closing timing, and wherein the above EGR mechanism is provided with an EGR passage which communicates an engine exhaust passage and engine intake passage and with an EGR valve which is provided in said EGR passage, and the opening degree of the EGR valve is made smaller when making the amount of EGR gas decrease.

7. A spark ignition type internal combustion engine as set forth in claim 6, wherein the above EGR valve is controlled in opening degree so that the amount of EGR gas which is returned into the surge tank becomes a certain amount or less.

8. A spark ignition type internal combustion engine comprising:

a variable closing timing mechanism able to change a closing timing of an intake valve after intake bottom dead center;

an EGR mechanism which makes a part of the exhaust gas flow again into a combustion chamber as EGR gas;

a throttle valve which is arranged in the engine intake passage; and a controller for controlling the variable closing timing mechanism and the EGR mechanism, wherein the amount of intake gas which is fed into the combustion chamber is mainly controlled by changing the closing timing of the intake valve, wherein the controller controls the variable closing timing mechanism and the EGR mechanism so that the closing timing of the intake valve is advanced when the amount of the EGR gas is large compared with when it is small, and wherein the amount of intake gas which is fed into a combustion chamber is controlled by changing an opening degree of the throttle valve in addition to changing the closing timing of the intake valve, and the above amount of EGR gas is made larger when the opening degree of the throttle valve is small compared with when it is large.

9. A spark ignition type internal combustion engine comprising:

a variable closing timing mechanism able to change a closing timing of an intake valve after intake bottom dead center;

an EGR mechanism which makes a part of the exhaust gas flow again into a combustion chamber as EGR gas; and a controller for controlling the variable closing timing mechanism and the EGR mechanism, wherein the amount of intake gas which is fed into the combustion chamber is mainly controlled by changing the closing timing of the intake valve, wherein the controller controls the variable closing timing mechanism and the EGR mechanism so that the closing timing of the intake valve is advanced when the amount of the EGR gas is large compared with when it is small, and wherein the extent by which the closing timing of the intake valve is advanced is made smaller when the engine load is high compared to when low.

10. A spark ignition type internal combustion engine comprising:

a variable closing timing mechanism able to change a closing timing of an intake valve after intake bottom dead center;

an EGR mechanism which makes a part of the exhaust gas flow again into a combustion chamber as EGR gas; and a controller for controlling the variable closing timing mechanism and the EGR mechanism, wherein the amount of intake gas which is fed into the combustion chamber is mainly controlled by changing the closing timing of the intake valve, wherein the controller controls the variable closing timing mechanism and the EGR mechanism so that the closing timing of the intake valve is advanced when the amount of the EGR gas is large compared with when it is small, and wherein the extent by which the closing timing of the intake valve is advanced is made smaller when the engine speed is high compared to when low.

11. A spark ignition type internal combustion engine comprising:

a variable closing timing mechanism able to change a closing timing of an intake valve after intake bottom dead center;

an EGR mechanism which makes a part of the exhaust gas flow again into a combustion chamber as EGR gas; and a controller for controlling the variable closing timing mechanism and the EGR mechanism, wherein the amount of intake gas which is fed into the combustion chamber is mainly controlled by changing the closing timing of the intake valve, wherein the controller controls the variable closing timing mechanism and the EGR mechanism so that the closing timing of the intake valve is advanced when the amount of the EGR gas is large compared with when it is small, and wherein the extent by which the closing timing of the intake valve is advanced is made smaller when the temperature of the engine coolant is high compared to when low.

12. A spark ignition type internal combustion engine comprising:

a variable closing timing mechanism able to change a closing timing of an intake valve after intake bottom dead center;

an EGR mechanism which makes a part of the exhaust gas flow again into a combustion chamber as EGR gas; and a controller for controlling the variable closing timing mechanism and the EGR mechanism, wherein the amount of intake gas which is fed into the combustion chamber is mainly controlled by changing the closing timing of the intake valve, wherein the controller controls the variable closing timing mechanism and the EGR mechanism so that the closing timing of the intake valve is advanced when the amount of the EGR gas is large compared with when it is small, and wherein the extent by which the closing timing of the intake valve is advanced is made smaller when a concentration of ethanol in the fuel is high compared to when low.

13. A spark ignition type internal combustion engine comprising:

a variable closing timing mechanism able to change a closing timing of an intake valve after intake bottom dead center;

an EGR mechanism making a part of exhaust gas flow again into a combustion chamber as EGR gas;

a variable compression ratio mechanism able to change a mechanical compression ratio; and a controller for controlling the variable closing timing mechanism and the EGR mechanism, wherein the controller controls the variable closing timing mechanism and the EGR mechanism so that the further the closing timing of the intake valve is to the retarded side, the more the amount of EGR gas is reduced, only in the region where the closing timing of the intake valve is at the retarded side from a specific timing, and wherein the mechanical compression ratio is made higher at the time of engine low load operation compared with at the time of engine high load operation.

14. A spark ignition type internal combustion engine as set forth in claim 13, wherein, at the time of engine low load operation, the mechanical compression ratio is made the maximum mechanical compression ratio.

15. A spark ignition type internal combustion engine as set forth in claim 13, wherein at the time of engine low load operation, the expansion ratio is made 20 or more.

16. A spark ignition type internal combustion engine comprising a variable closing timing mechanism able to change a closing timing of an intake valve after intake bottom dead center, an EGR mechanism part making a part of exhaust gas flow again into a combustion chamber as EGR gas and a controller for controlling the variable closing timing mechanism and the EGR mechanism, wherein the controller makes the amount of EGR gas decrease when the closing timing of the intake valve is at a retarded side compared to when it is at an advanced side, the controller calculates the amount of EGR gas to be fed into the combustion chamber based on not only the closing timing of the intake valve, but also a temperature of engine coolant, and the controller controls the above EGR mechanism so as to give the smaller amount of EGR gas between the amount of EGR gas which is calculated based on the closing timing of the intake valve and the amount of EGR gas which is calculated based on the temperature of the engine coolant.

17. A spark ignition type internal combustion engine comprising:

a variable closing timing mechanism able to change a closing timing of an intake valve after intake bottom dead center;

an EGR mechanism which makes a part of the exhaust gas flow again into a combustion chamber as EGR gas;

a variable compression ratio mechanism able to change a mechanical compression ratio; and a controller for controlling the variable closing timing mechanism and the EGR mechanism, wherein the amount of intake gas which is fed into the combustion chamber is mainly controlled by changing the closing timing of the intake valve, wherein the controller controls the variable closing timing mechanism and the EGR mechanism so that the closing timing of the intake valve is advanced when the amount of the EGR gas is large compared with when it is small, and wherein the mechanical compression ratio is made higher at the time of engine low load operation compared with at the time of engine high load operation.

* * * * *